(12) United States Patent
Klein et al.

(10) Patent No.: US 8,725,635 B2
(45) Date of Patent: May 13, 2014

(54) ONLINE PAYMENT SYSTEM AND MED

(75) Inventors: Charmaine Klein, Charlotte, NC (US);
Hitesh Bajaj, Charlotte, NC (US);
Christopher G. Gagliardo, Charlotte,
NC (US); Peter Nies, San Francisco, CA
(US); Abla L. Hamilton, San Francisco,
CA (US)

(73) Assignee: Bank of America Corporation,
Charlotte, NC (US)

( * ) Notice: Subject to any disclaimer, the term of this patent is extended or adjusted under 35 U.S.C. 154(b) by 34 days.

(21) Appl. No.: 13/200,471

(22) Filed: Sep. 23, 2011

(65) Prior Publication Data

US 2012/0116973 A1 May 10, 2012

Related U.S. Application Data

(60) Provisional application No. 61/410,087, filed on Nov. 4, 2010.

(51) Int. Cl.
*G06Q 20/10* (2012.01)

(52) U.S. Cl.
USPC .................................. 705/39; 705/35; 705/44

(58) Field of Classification Search
CPC ....................................................... G06Q 20/10
USPC ................................................ 705/35, 39, 44
See application file for complete search history.

(56) References Cited

U.S. PATENT DOCUMENTS

| | | | | |
|---|---|---|---|---|
| 7,089,208 | B1* | 8/2006 | Levchin et al. | 705/39 |
| 7,848,980 | B2* | 12/2010 | Carlson | 705/35 |
| 2002/0029193 | A1* | 3/2002 | Ranjan et al. | 705/39 |
| 2009/0192940 | A1* | 7/2009 | Mann et al. | 705/44 |
| 2010/0042538 | A1* | 2/2010 | Dheer et al. | 705/40 |
| 2010/0306091 | A1* | 12/2010 | Homer et al. | 705/34 |
| 2011/0040686 | A1* | 2/2011 | Carlson | 705/44 |

* cited by examiner

*Primary Examiner* — Jagdish Patel
(74) *Attorney, Agent, or Firm* — Michael A. Springs; Moore & Van Allen PLLC; Nicholas C. Russell

(57) ABSTRACT

System, method, and computer program product are provided for a user to send and receive P2P payments using the Internet. Through the use of a network, a user may access accounts the user has at a financial institution and direct payments to other individuals or entities using the other individuals or entities alias. In this way, the user may ensure a secure payment to a third-party through the network associated with a financial institution. The payments may be directed to individuals the user may input into the system by providing the user's alias. A user's alias may be a unique identifier of the user and tied to a financial account of that user. In this way, the sender of the P2P payments may input the recipient's alias and transfer funds via the P2P payment system without having to input the recipient's account information.

25 Claims, 30 Drawing Sheets

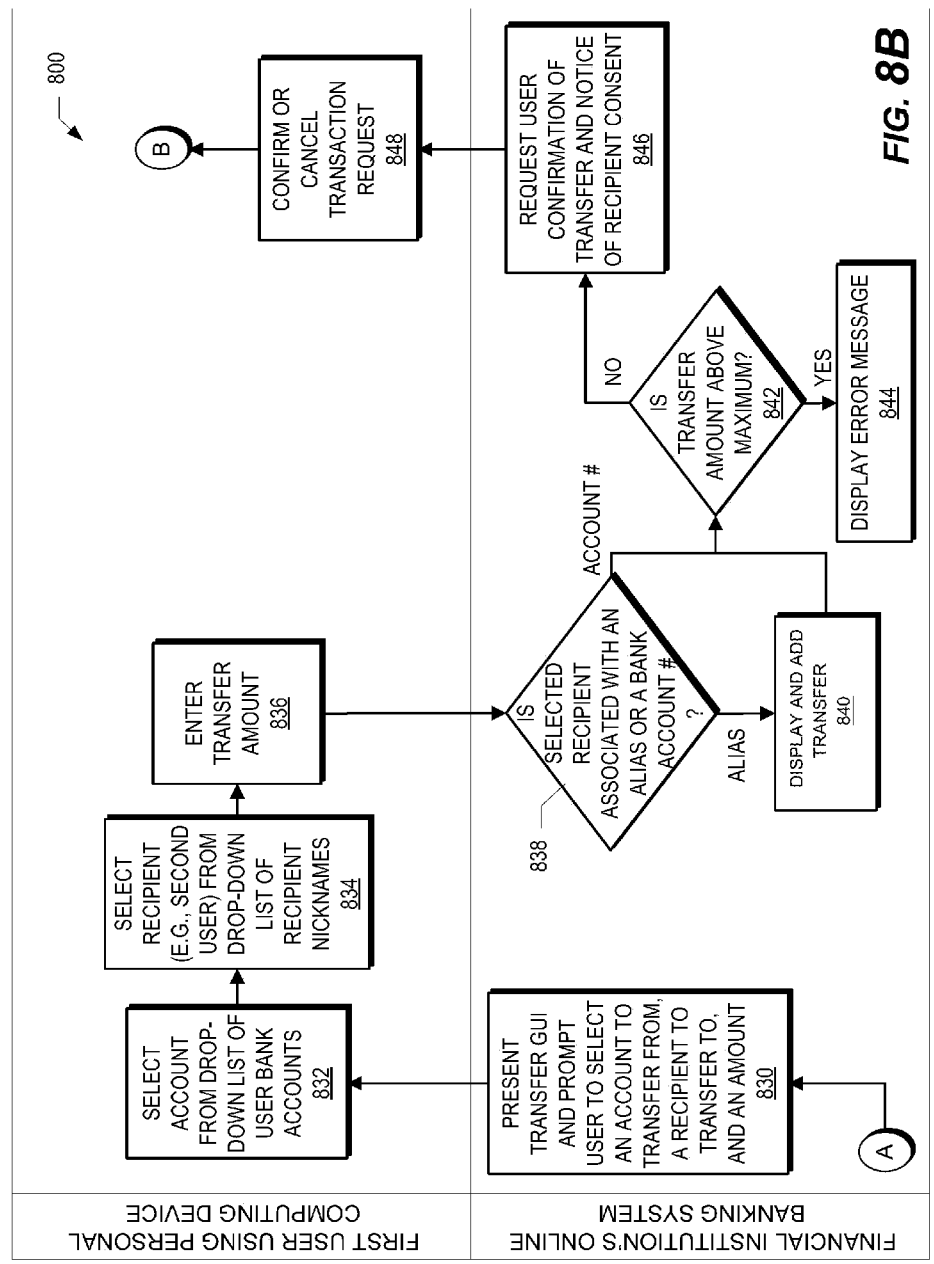

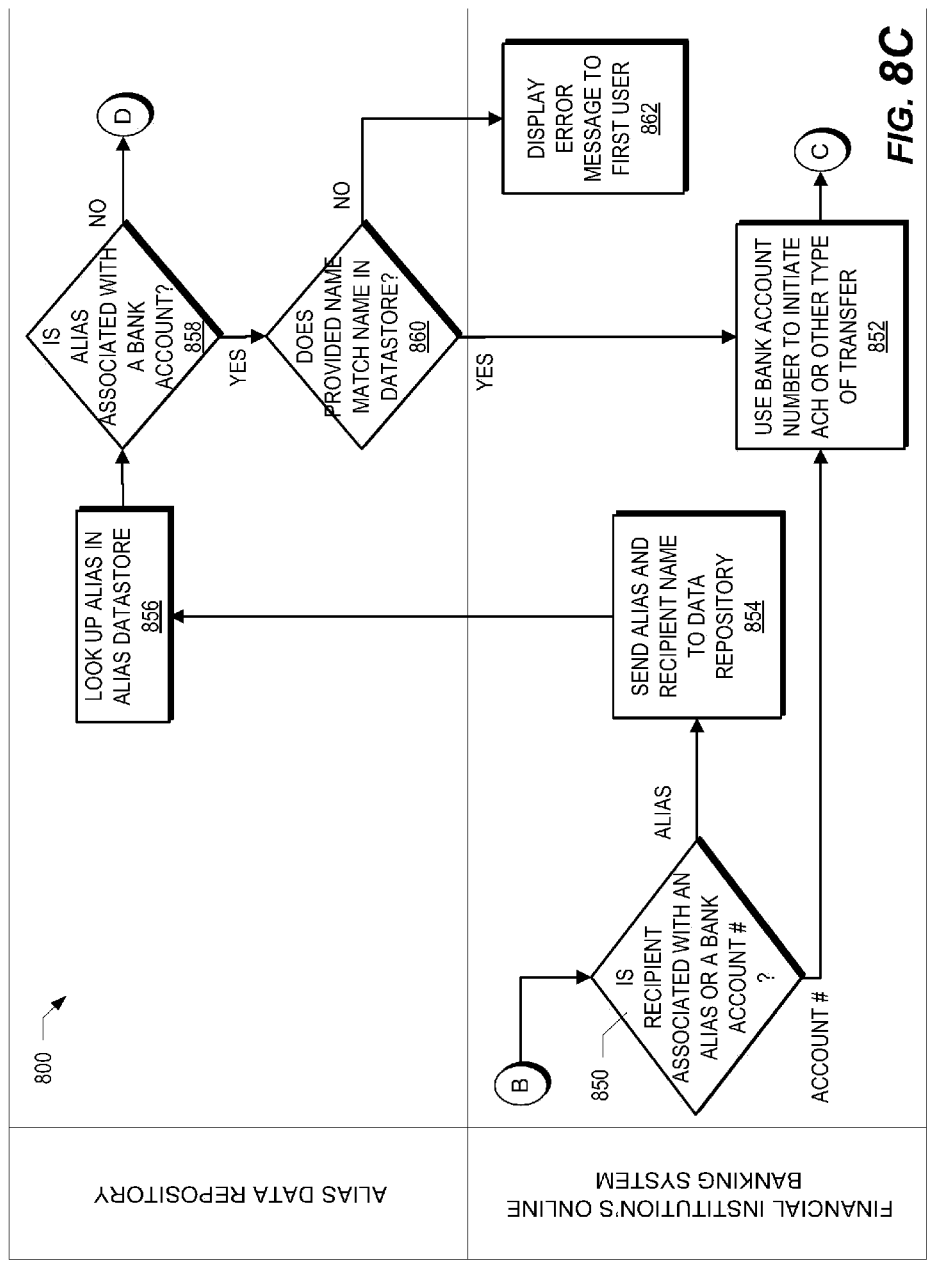

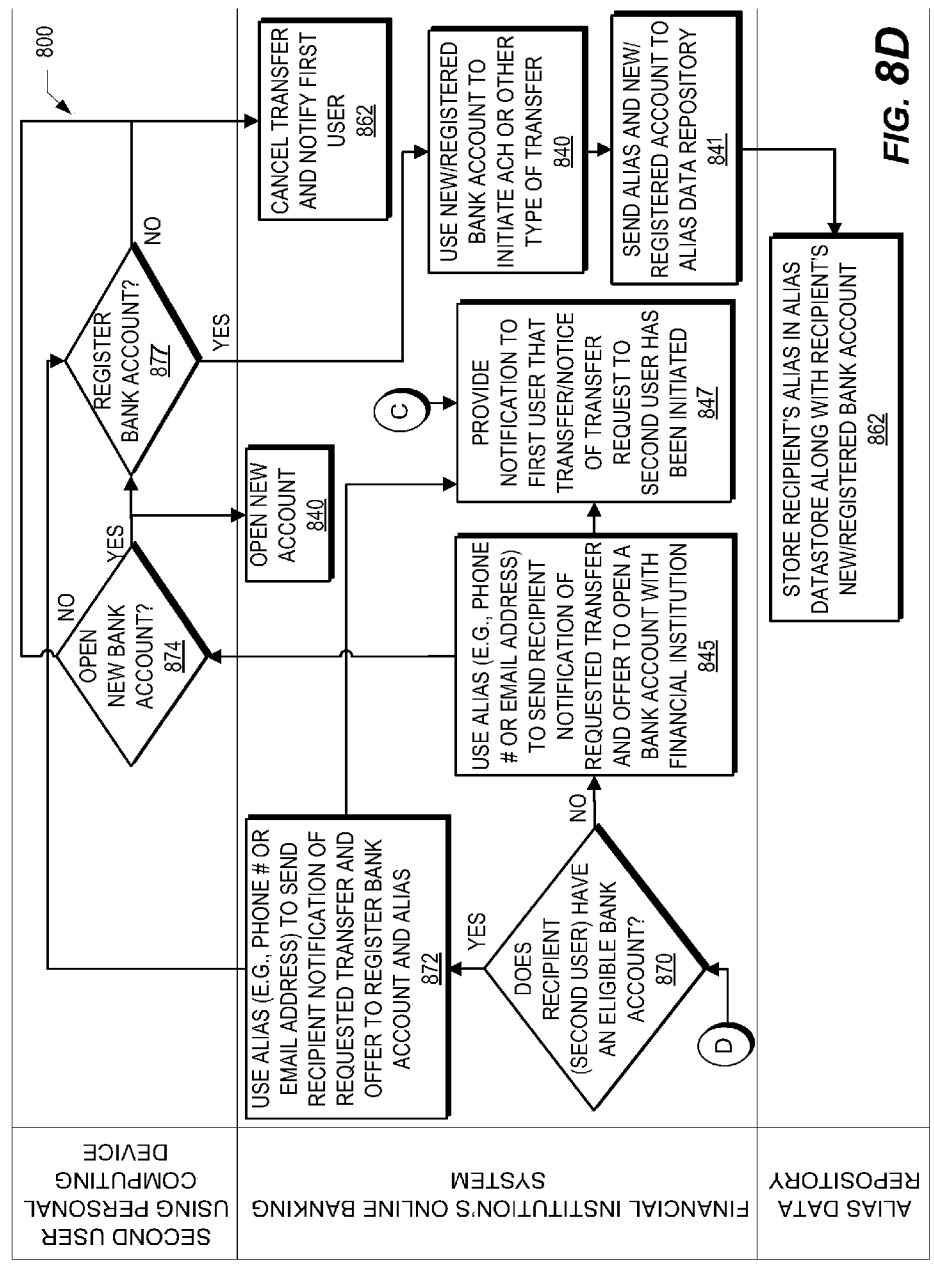

MAKE TRANSFER (SITE AGREEMENT ACCEPTED)

COMPANY 1      ONLINE BANKING    SIGN OFF
LOCATIONS · MAIL · HELP · EN ESPANOL

ACCOUNTS | BILL PAY | TRANSFERS | INVESTMENTS | CUSTOMER SERVICE    [ENTER KEYWORD(S)]

| MAKE TRANSFER | REVIEW TRANSFERS | ADD RECIPIENT | MANAGE ACCOUNTS |

MAKE TRANSFER

NEW WAYS TO TRANSFER MONEY

USE JUST AN EMAIL ADDRESS OR MOBILE PHONE NUMBER TO SEND AND RECEIVE FUNDS EASILY, WITHOUT NEEDING TO KNOW ACCOUNT NUMBERS.

ADD A NEW TRANSFER RECIPIENT

SET UP AND START USING THIS FEATURE

LEARN MORE ABOUT HOW IT WORKS

QUICK HELP

USE THIS PAGE TO TRANSFER FUNDS FROM YOUR ACCOUNT TO ANOTHER COMPANY1 ACCOUNT OWNED BY YOU OR SOMEONE ELSE.

YOU CAN ALSO SEND MONEY FROM THIS PAGE USING A RECIPIENT'S EMAIL ADDRESS OR MOBILE NUMBER.

▷ WHAT CAN I DO?
▷ WHAT DO I NEED TO KNOW?
▷ WHAT ELSE CAN I DO?

INSIDE THE BANK | OUTSIDE THE BANK

ⓘ NEW! INSIDE THE BANK TRANSFERS NOW INCLUDES TRANSFERS MADE USING A RECIPIENT'S EMAIL ADDRESSES OR MOBILE NUMBER.
LEARN MORE | HIDE THIS MESSAGE

PLEASE COMPLETE ALL OF THE INFORMATION.

FROM: [SELECT ACCOUNT ▼]
TO: [SELECT ACCOUNT ▼]
AMOUNT: $ [      ]
FREQUENCY: [ONE TIME, IMMEDIATELY ▼]

[CONTINUE]

TRANSFERRING MONEY BETWEEN COMPANY1 CUSTOMERS IS FAST AND FREE>>

💡 QUICK TIP — WANT TO MOVE MONEY QUICKLY? ONLINE BANKING PROVIDES A SECURE WAY TO SEND FUNDS TO FAMILY AND FRIENDS WHO HAVE A COMPANY1 ACCOUNT. WHY WRITE A CHECK WHEN YOU CAN TRANSFER THE FUNDS ONLINE? CLICK THE ABOVE LINK TO GET STARTED.

*FIG. 9C*

| ADD RECIPIENT (COMPANY2) | |
|---|---|
| COMPANY 1 | ONLINE BANKING    SIGN OFF |
| | LOCATIONS · MAIL · HELP · EN ESPANOL |

| ACCOUNTS | BILL PAY | TRANSFERS | INVESTMENTS | CUSTOMER SERVICE | | ENTER KEYWORD(S) |

MAKE TRANSFER | REVIEW TRANSFERS | ADD RECIPIENT | MANAGE ACCOUNTS

ADD RECIPIENT

QUICK HELP

USE THIS PAGE TO TRANSFER FUNDS FROM YOUR ACCOUNT TO ANOTHER COMPANY1 ACCOUNT OWNED BY YOU OR SOMEONE ELSE.

▷ WHAT CAN I DO?
▷ WHAT DO I NEED TO KNOW?
▷ WHAT ELSE CAN I DO?

| INSIDE THE BANK | OUTSIDE THE BANK |

ADD A NEW RECIPIENT
PLEASE PROVIDE THE REQUIRED INFORMATION AND SELECT ADD RECIPIENT TO CONTINUE.

\* = REQUIRED INFORMATION

\* RECIPIENT'S FIRST NAME: [          ]
\* RECIPIENT'S LAST NAME: [          ]
NICKNAME FOR RECIPIENT: [          ]

\* TRANSFER METHOD: ⊙ EMAIL ADDRESS OR MOBILE NUMBER
                    ○ COMPANY1 ACCOUNT NUMBER

\* RECIPIENT'S EMAIL ADDRESS OR MOBILE NUMBERS: [          ]
(EXAMPLE: NAME@EMAIL.COM, XXX-XXX-XXXX)

\* CONFIRM EMAIL ADDRESS OR MOBILE NUMBERS: [          ]
(EXAMPLE: NAME@EMAIL.COM, XXX-XXX-XXXX)

COMPANY2
▣ MOBILE
▣ CARD     [ SEND CODE NOW ]

SEND COMPANY2 CODE AS A TEXT MESSAGE TO YOUR MOBILE DEVICE.

[ ADD RECIPIENT ] [ CANCEL ]

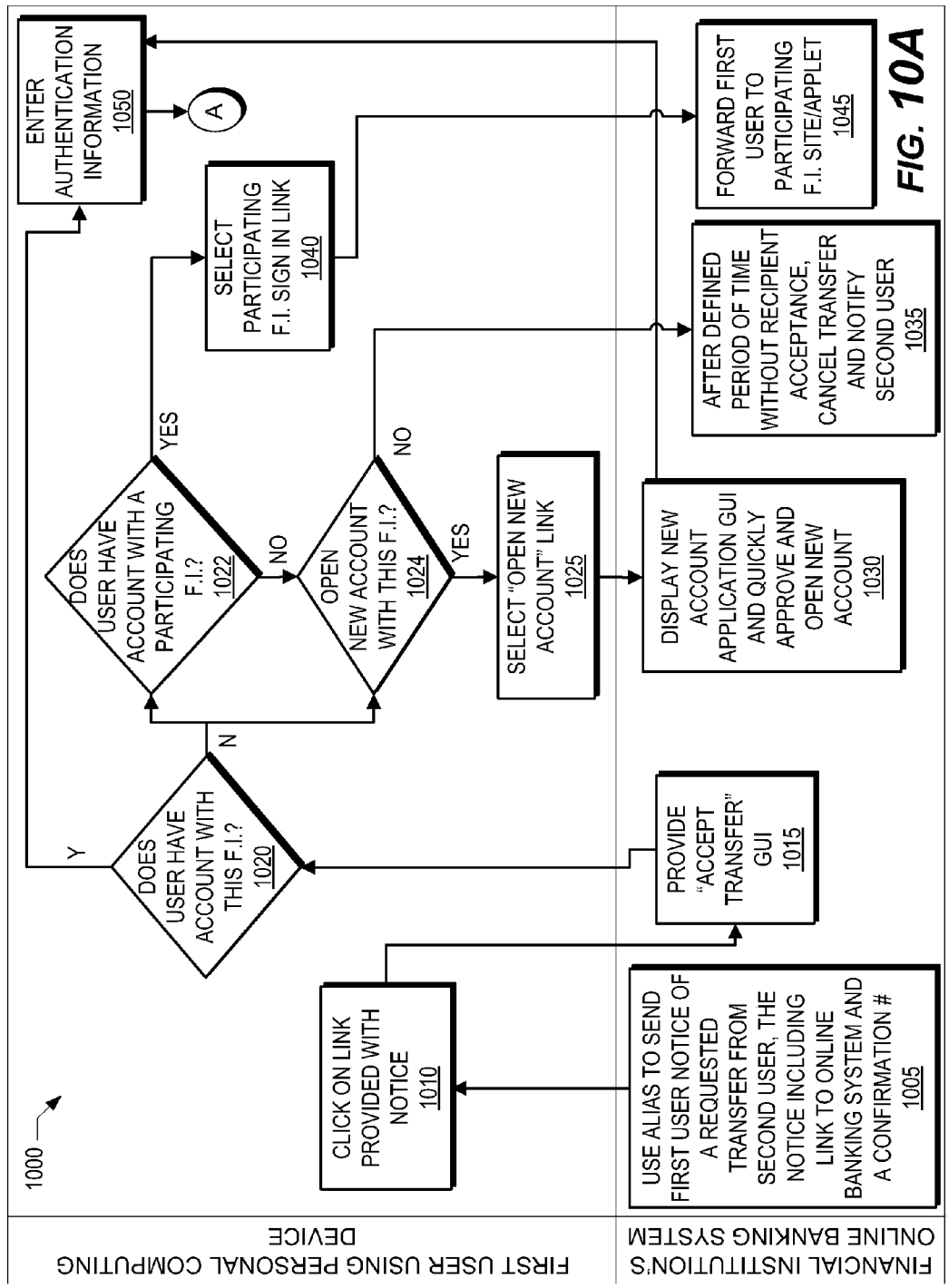

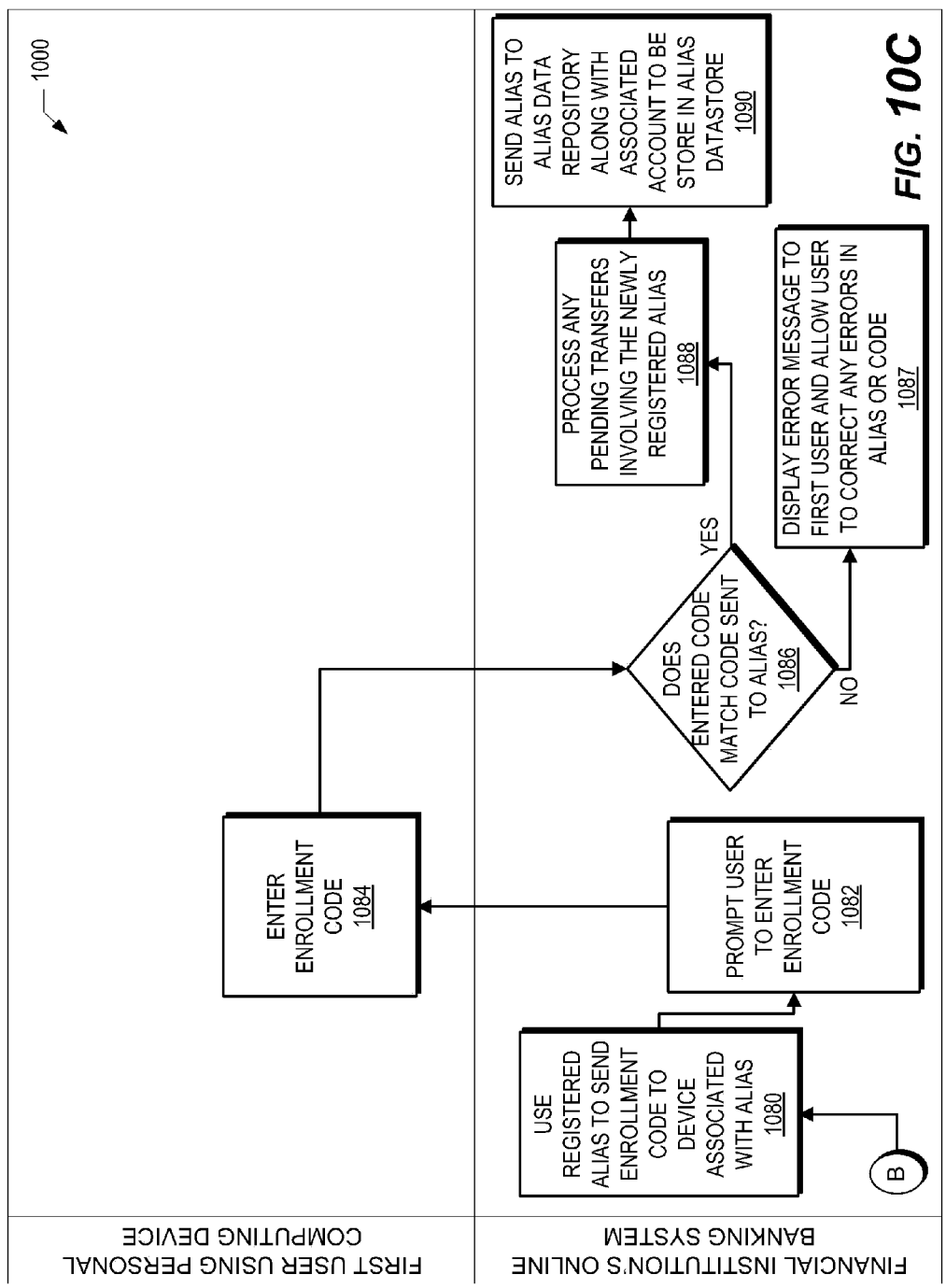

RECEIVE MONEY LANDING PAGE

COMPANY 1

SIGN IN ▸ EN ESPANOL

ACCEPT YOUR FUNDS TRANSFER NOW

TO ACCEPT THIS TRANSFER, YOU NEED AN ELIGIBLE CHECKING OR SAVINGS ACCOUNT AT ONE OF THE PARTICIPATING BANKS. PLEASE SELECT AN OPTION BELOW TO COMPLETE THE TRANSACTION. LEARN MORE ABOUT THIS TRANSFER

PARTICIPATING BANK CUSTOMERS

COMPANY1

🔒 SECURE SIGN IN

ONLINE ID:

☐ SAVE THIS ONLINE ID
I FORGOT MY ONLINE ID

[ CHECK YOUR SITEKEY ]

NOT USING ONLINE BANKING? ENROLL NOW >>

BANK CUSTOMERS   [ SIGN IN ]

CUSTOMERS OF OTHER BANKS

IF YOU DON'T HAVE AN ACCOUNT WITH ONE OF THE PARTICIPATING BANKS, AND YOU:

WANT TO OPEN AN ACCOUNT
- YOU CAN OPEN A COMPANY1 ACCOUNT.
- PLEASE CAREFULLY REVIEW THE TERMS OF THE ACCOUNT, INCLUDING ANY APPLICABLE FEES.

DON'T WANT TO OPEN AN ACCOUNT NOW
- PLEASE NOTIFY THE SENDER TO ARRANGE AN ALTERNATE TRANSFER METHOD.
- THIS TRANSACTION WILL BE CANCELED IF NOT ACCEPTED AFTER 14 BUSINESS DAYS.

*FIG. 11A*

OLB INTERSTITIAL

COMPANY 1        ONLINE BANKING    SIGN OFF
LOCATIONS · MAIL · HELP · EN ESPAÑOL

ACCOUNTS | BILL PAY | TRANSFERS | INVESTMENTS | CUSTOMER SERVICE     ENTER KEYWORD(S)

ACCEPT TRANSFER TO YOUR EMAIL ADDRESS MOBILE NUMBER

DID YOU RECEIVE A TRANSFER NOTICE FROM SOMEONE YOU KNOW? YOU CAN COMPLETE THIS TRANSACTION AND COLLECT THE MONEY BY SETTING UP YOUR EMAIL ADDRESS OR MOBILE PHONE NUMBER TO ACCEPT TRANSFERS. PLEASE ENTER THE CONFIRMATION NUMBER FROM YOUR TRANSFER NOTICE AND SELECT VARIFY EMAIL OR MOBILE TO CONTINUE.

\* = REQUIRED

\* ENTER YOUR CONFIRMATION NUMBER: [        ]

☐ BY CHECKING THIS BOX, I CONFIRM THAT I:

A) HAVE READ AND AGREE TO THE TERMS OF THE SERVICE AGREEMENT, INCLUDING THE TERMS OF THE EMAIL/MOBILE NETWORK TRANSFERS SECTIONS;
B) CONSENT TO RECEIVE EMAIL AND AUTOMATED TEXT MESSAGES ABOUT EMAIL/MOBILE TRANSFERS;
C) WILL ONLY REGISTER MOBILE NUMBERS WHERE I AM THE ACCOUNT HOLDER; OR IF AM NOT THE ACCOUNT HOLDER, I HAVE THE ACCOUNT HOLDER'S PERMISSION TO REGISTER THAT MOBILE NUMBER; AND
D) WILL OBTAIN THE CONSENT OF THE PERSON TO WHOM I WANT TO SEND A MOBILE TRANSFER TEXT MESSAGE TO RECEIVE THE AUTOMATED TEXT MESSAGE.

[ I AGREE ]  [ I DON'T AGREE ]

FIG. 11B

ADD ALIAS, SELECT ACCOUNT

COMPANY 1  ONLINE BANKING  SIGN OFF
LOCATIONS · MAIL · HELP · EN ESPANOL

ACCOUNTS | BILL PAY | TRANSFERS | INVESTMENTS | CUSTOMER SERVICE     ENTER KEYWORD(S)

MAKE TRANSFER | REVIEW TRANSFERS | ADD RECIPIENT | MANAGE ACCOUNTS

MANAGE ACCOUNTS

QUICK HELP

USE THIS PAGE TO SET UP A NEW TRANSFER RECIPIENT. YOU CAN ADD SOMEONE BY PROVIDING THE PERSON'S EMAIL ADDRESS, MOBILE NUMBER OR COMPANY 1 ACCOUNT NUMBER.

▷ WHAT CAN I DO?
▷ WHAT DO I NEED TO KNOW?
▷ WHAT ELSE CAN I DO?

INSIDE THE BANK | OUTSIDE THE BANK

SET UP EMAIL ADDRESS OR MOBILE NUMBER TO ACCEPT TRANSFERS
IF YOU RECEIVED A NOTICE THAT SOMEONE SENT YOU MONEY, YOU WILL NEED TO SET UP THE SAME EMAIL ADDRESS OR MOBILE NUMBER THAT RECEIVED THE TRANSFER NOTICE.

ENTER YOUR EMAIL ADDRESS OR
MOBILE NUMBER:

CONFIRM YOUR EMAIL ADDRESS
OR MOBILE NUMBER:

SELECT AN ACCOUNT TO
RECEIVE THE FUNDS:

☑ BY REGISTERING THIS EMAIL ADDRESS OR MOBILE NUMBER, I AGREE THAT I AM THE EMAIL OR MOBILE NUMBER ACCOUNT HOLDER, OR HAVE THE ACCOUNT HOLDER'S PERMISSION TO REGISTER IT, AND I CONSENT TO RECEIVE EMAIL AND AUTOMATED TEXT MESSAGES ABOUT EMAIL/MOBILE TRANSFERS AT THIS EMAIL ADDRESS OR MOBILE NUMBER.

PLEASE NOTE: THIS INFORMATION WILL BE SAVED FOR ANY TRANSFERS SENT TO YOU AT THE EMAIL ADDRESS OR MOBILE NUMBER YOU PROVIDED.

COMPANY2
▢ MOBILE
▢ CARD    [SEND CODE NOW]
SEND COMPANY2 CODE AS A TEXT MESSAGE TO YOUR MOBILE DEVICE.

TO COMPLETE SETUP, SELECT CONTINUE AND GET YOUR ENROLLMENT CODE.

[CONTINUE] [CANCEL]

MESSAGE & DATA RATES MAY APPLY.
FOR HELP TEXT "HELP" TO XXXXX.
TO CANCEL YOUR PLAN, SEND A TEXT "STOP" TO XXXXX AT ANYTIME.
IN CASE OF QUESTIONS PLEASE CONTACT CUSTOMER SERVICE AT 1.800.XXX.XXXX.

*FIG. 11C*

VERIFY ALIAS

COMPANY 1  ONLINE BANKING   SIGN OFF
LOCATIONS · MAIL · HELP · EN ESPAÑOL

ACCOUNTS | BILL PAY | TRANSFERS | INVESTMENTS | CUSTOMER SERVICE    ENTER KEYWORD(S)

MAKE TRANSFER | REVIEW TRANSFERS | ADD RECIPIENT | MANAGE ACCOUNTS

MANAGE ACCOUNTS

QUICK HELP

USE THIS PAGE TO SET UP A NEW TRANSFER RECIPIENT. YOU CAN ADD SOMEONE BY PROVIDING THE PERSON'S EMAIL ADDRESS, MOBILE NUMBER OR COMPANY 1 ACCOUNT NUMBER.

▷ WHAT CAN I DO?
▷ WHAT DO I NEED TO KNOW?
▷ WHAT ELSE CAN I DO?

INSIDE THE BANK | OUTSIDE THE BANK

VERIFY YOUR MOBILE NUMBER TO COMPLETE ENROLLMENT
PLEASE CHECK YOUR MOBILE PHONE FOR A TEXT MESSAGE FROM COMPANY1.

WE HAVE SENT AN ENROLLMENT CODE TO:

WHAT IS AN ENROLLMENT CODE?

TO VERIFY OWNERSHIP OF THIS MOBILE NUMBER AND COMPLETE ENROLLMENT, PLEASE ENTER THE AUTHORIZATION NUMBER IN THE SPACE BELOW. YOUR NUMBER WILL EXPIRE AFTER 10 MINUTES.

PLEASE ENTER THE 6-DIGIT AUTHORIZATION NUMBER YOU RECEIVED AND SELECT CONTINUE.

ENTER YOUR 6-DIGIT ENROLLMENT CODE: [          ]
(NO DASHES OR SPACES)

ENROLLMENT CODE NOT RECEIVED OR IS EXPIRED?

[CONTINUE] [CANCEL]

*FIG. 11D*

| COMPANY 1 | ONLINE BANKING　SIGN OFF |
|---|---|
| | LOCATIONS · MAIL · HELP · EN ESPAÑOL |

| ACCOUNTS | BILL PAY | TRANSFERS | INVESTMENTS | CUSTOMER SERVICE | ENTER KEYWORD(S) |

| MAKE TRANSFER | REVIEW TRANSFERS | ADD RECIPIENT | MANAGE ACCOUNTS |

MAKE TRANSFER

RECEIVED A TRANSFER NOTICE?

DID YOU GET AN EMAIL OR TEXT MESSAGE WITH A NOTICE THAT SOMEONE SENT YOU MONEY?

TO COMPLETE THIS TRANSFER AND COLLECT THE FUNDS, PLEASE SET UP YOUR EMAIL ADDRESS OR MOBILE NUMBER TO ACCEPT TRANSFERS.

GET SET UP TO ACCEPT TRANSFER

LEARN MORE ABOUT THIS TRANSFER METHOD

QUICK HELP

USE THIS PAGE TO TRANSFER FUNDS FROM YOUR ACCOUNT TO ANOTHER COMPANY1 ACCOUNT OWNED BY YOU OR SOMEONE ELSE.

YOU CAN ALSO SEND MONEY FROM THIS PAGE USING A RECIPIENT'S EMAIL ADDRESS OR MOBILE NUMBER.

▷ WHAT CAN I DO?
▷ WHAT DO I NEED TO KNOW?
▷ WHAT ELSE CAN I DO?

| INSIDE THE BANK | OUTSIDE THE BANK |

ⓘ NEW! INSIDE THE BANK TRANSFERS NOW INCLUDES TRANSFERS MADE USING A RECIPIENT'S EMAIL ADDRESSES OR MOBILE NUMBER.
LEARN MORE | HIDE THIS MESSAGE

PLEASE COMPLETE ALL OF THE INFORMATION.
FROM: [SELECT ACCOUNT ▼]
TO: [SELECT ACCOUNT ▼]
AMOUNT: $ [        ]
FREQUENCY: [ONE TIME, IMMEDIATELY ▼]

[CONTINUE]

QUICK TIP — TRANSFERRING MONEY BETWEEN COMPANY1 CUSTOMERS IS FAST AND FREE>>

WANT TO MOVE MONEY QUICKLY? ONLINE BANKING PROVIDES A SECURE WAY TO SEND FUNDS TO FAMILY AND FRIENDS WHO HAVE A COMPANY1 ACCOUNT. WHY WRITE A CHECK WHEN YOU CAN TRANSFER THE FUNDS ONLINE? CLICK THE ABOVE LINK TO GET STARTED.

FIG. 11F

DELETE RECIPIENT

COMPANY 1

ONLINE BANKING    SIGN OFF

LOCATIONS · MAIL · HELP · EN ESPANOL

ACCOUNTS | BILL PAY | TRANSFERS | INVESTMENTS | CUSTOMER SERVICE    ENTER KEYWORD(S)

MAKE TRANSFER | REVIEW TRANSFERS | ADD RECIPIENT | MANAGE ACCOUNTS

MANAGE ACCOUNTS

QUICK HELP

USE THIS PAGE TO SET UP A NEW TRANSFER RECIPIENT. YOU CAN ADD SOMEONE BY PROVIDING THE PERSON'S EMAIL ADDRESS, MOBILE NUMBER OR COMPANY1 ACCOUNT NUMBER.

▷ WHAT CAN I DO?
▷ WHAT DO I NEED TO KNOW?
▷ WHAT ELSE CAN I DO?

INSIDE THE BANK | OUTSIDE THE BANK

OUTBOUND TRANSFER RECIPIENTS

| RECIPIENT NAME | ACCOUNT NICKNAME | STATUS | LAST TRANSFER |
|---|---|---|---|

DELETE OUTBOUND RECIPIENT    CLOSE ☒

ARE YOU SURE YOU WANT TO DELETE THIS RECIPIENT?

ONCE THE RECIPIENT IS DELETED, YOU WILL NO LONGER BE ABLE TO MAKE TRANSFERS TO THIS PERSON.

[ DELETE ]   [ DON'T DELETE ]

ADD A RECIPIENT

INBOUND TRANSFER OPTIONS

EMAIL OR MOBILE      DEPOSIT ACCOUNT

*FIG. 12C*

ONLINE PAYMENT SYSTEM AND METHOD

CLAIM OF PRIORITY UNDER 35 U.S.C. §119

This Non-provisional Patent Application claims priority to Provisional Patent Application Ser. No. 61/410,087 titled "Online Payment System and Method" filed on Nov. 4, 2010, assigned to the assignee hereof and herby expressly incorporated by reference herein.

BACKGROUND

With the wide adoption of credits cards, debit cards, electronic payment devices, online shopping systems, and online banking systems, very few people today carry a lot of cash or write many checks. However, people still need to transfer money to each other for all sorts of reasons. For example, a person may want to pay a friend back for money recently borrowed from the friend, or a person may want to send money to a relative as a gift. Giving or lending money to another person, however, can be difficult when you don't have cash on hand and/or if the person is not physically present. The process may need to involve going to an automated teller machine (ATM) or mailing the person a check, both of which can be time consuming and inconvenient depending on the situation.

Money can be transferred from one person to another using electronic banking systems, but these systems traditionally require that the sender know account information for the receiver in order to instruct the bank to transfer money to the proper account. Most people do not know the account numbers of their friends, nor do most people want to widely publicize their account numbers for security reasons.

Some third party service providers try to facilitate payments from one person to another, but many people do not like these systems because they require opening yet another account with another online entity, remembering yet another username and password, and disclosing confidential financial institution account information to these other companies. In addition to the inconvenience and the security concerns, these systems generally take time set up and are not user-friendly.

For all these reasons and others, there is a need for improved user-friendly systems and methods for transferring money between two people and/or other entities, especially if such systems can transfer money directly to and/or from financial institution accounts, such as demand deposit accounts (e.g., checking accounts), savings accounts, and/or credit accounts.

BRIEF SUMMARY

Embodiments of the present invention address these and/or other needs by providing an innovative person-to-person (P2P) payment system along with a user-friendly interface and process for sending and receiving P2P payments. Advantageously, embodiments of the invention do not necessarily require users to share confidential account information with others in order to send and receive payments. In fact, embodiments of the invention do not require that the payment sender know any information about the financial accounts of the intended payment recipient. Furthermore, embodiments of the invention enable users to attempt to make payments to persons that are not customers of the same financial institution and to persons that are not customers of any financial institution. Embodiments of the invention also create a "viral" account opening and payment system registration process whereby one person's use of the system encourages others to use the system.

More specifically, embodiments of the invention allow an entity to transfer funds to another entity using a mobile telephone number, electronic mail (email) address, and/or other alias of the transfer recipient. The assignee of the present application describes some embodiments of such an invention in U.S. Provisional Patent Application No. 60/991,172, filed on Nov. 29, 2007, and co-pending U.S. patent application Ser. No. 12/038,177, filed on Feb. 27, 2008, as well as in U.S. patent application Ser. Nos. 12/881,071, 12/881,073, 12/881,074, and 12/881,080 continuing therefrom. Embodiments of the present invention include and build off of those earlier embodiments to provide an improved P2P payment system and a more user-friendly, secure, and convenient user interface and method.

Furthermore, embodiments of the invention include and build off of the following applications sharing a common assignee with the present application: U.S. Provisional Patent Application No. 61/410,085, filed on Nov. 4, 2010; U.S. Design patent application Ser. No. 29/378,420, filed on Nov. 4, 2010; and U.S. Design patent application Ser. No. 29/378,418, filed on Nov. 4, 2010, and as such, herein incorporate these applications by reference.

As described in greater detail below, the user interface can be incorporated into the online banking website of a bank or other financial institution. A user can authenticate her identity using the online banking authentication system and the user's authentication information and procedures that are already known to the user for interacting with online banking. The user can then use the online banking interface to register a mobile phone number, email address, or other alias by associating the number, address, or other alias with one of the user's financial institution accounts. This association is then stored in a data repository that can later be accessed by the bank and, in some cases, other financial institutions. Some embodiments of the invention provide a system for verifying that the alias is owned, held, or otherwise associated with the user, the system including immediately sending a code to the user's device using the alias (e.g., sending a code in a text or email) and having the user enter the code into the online banking interface shortly thereafter.

The online banking interface can also be used to initiate transfers to others using aliases. In some embodiments of the invention, a user can create a transfer recipient by entering the recipient's name, alias (e.g., mobile phone number or email address), and a descriptive name for the person, commonly referred to as a nickname. The user can then create a transfer request by using the online banking interface to select an account associated with the user's online banking account, enter or select the nickname of the saved recipient, and enter a monetary amount. The banking system then accesses the data repository to determine whether the alias is registered and thereby associated with a financial institution account. If the alias is registered, the banking system sends a transfer notification to the recipient using the alias and/or initiates the funds transfer. If the alias is not registered, then the banking system uses the alias to send the transfer recipient a notification (e.g., a text message, email or the like), the notification telling the person that there is a pending transfer that will be processed if the person registers her alias with an existing financial institution account and/or opens a new financial institution account. The notification then provides a link to the online banking website, a mobile banking website, or a mobile banking application that allows the person to easily register an existing account or open a new account.

Embodiments of the invention also provide a user interface that makes it easy for users to monitor their current, future, pending, and past person-to-person (P2P) and/or person-to-merchant (P2M) funds transfers as well as their saved transfer recipient list, alias registrations, incoming transfers, and/or other related information.

Embodiments of the invention relate to systems, methods, and computer program products for online entity to entity transfer of payments, comprising: receiving payment instructions from a financial institution customer, wherein the payment instructions include a payment account, a payment amount, and an alias associated with a payment recipient; determining that the payment recipient is a registered payment recipient based at least in part on the alias associated with the payment recipient; communicating a payment notification to the payment recipient based on the payment recipient being the registered payment recipient; and transferring the payment amount from an account associated with the financial institution customer to an account associated with the alias of the payment recipient.

In some embodiments, the invention further comprises monitoring online payments such that online payment history may be determined and provided to the financial institution customer via an online interface.

In some embodiments, the payment instructions from a financial institution customer may be received from the financial institution customer through a network. The payment instructions may further be received by a customer not associated with the financial institution. If the customer is not associated with the financial institution, the customer may be provided an opportunity to opt-in to receive and send online payments.

In some embodiments, the invention further comprises determining that the payment recipient is an entity associated with the financial institution. Furthermore, a determination of the payment account of the payment recipient may be based at least in part on the alias associated with the payment recipient. The alias may comprise personal identification information about the payment recipient, such that the alias is unique to the payment recipient.

In some embodiments, the transferring of the payment amount from the account associated with the financial institution customer to an account associated with the payment recipient is based at least in part on the payment notification.

It should be appreciated that at least some embodiments of the invention provide a more convenient, user friendly, and secure P2P payment system because it is provided by the user's bank, through the bank's online banking system with which the user is already familiar. In at least some embodiments, the user may not need to share personal or confidential information, such as account information, with people or businesses outside of the user's bank. The user can feel more secure having P2P payment services handled by their bank and having the convenience of being able to directly send money from and/or receive money into the user's one or more financial institution accounts.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
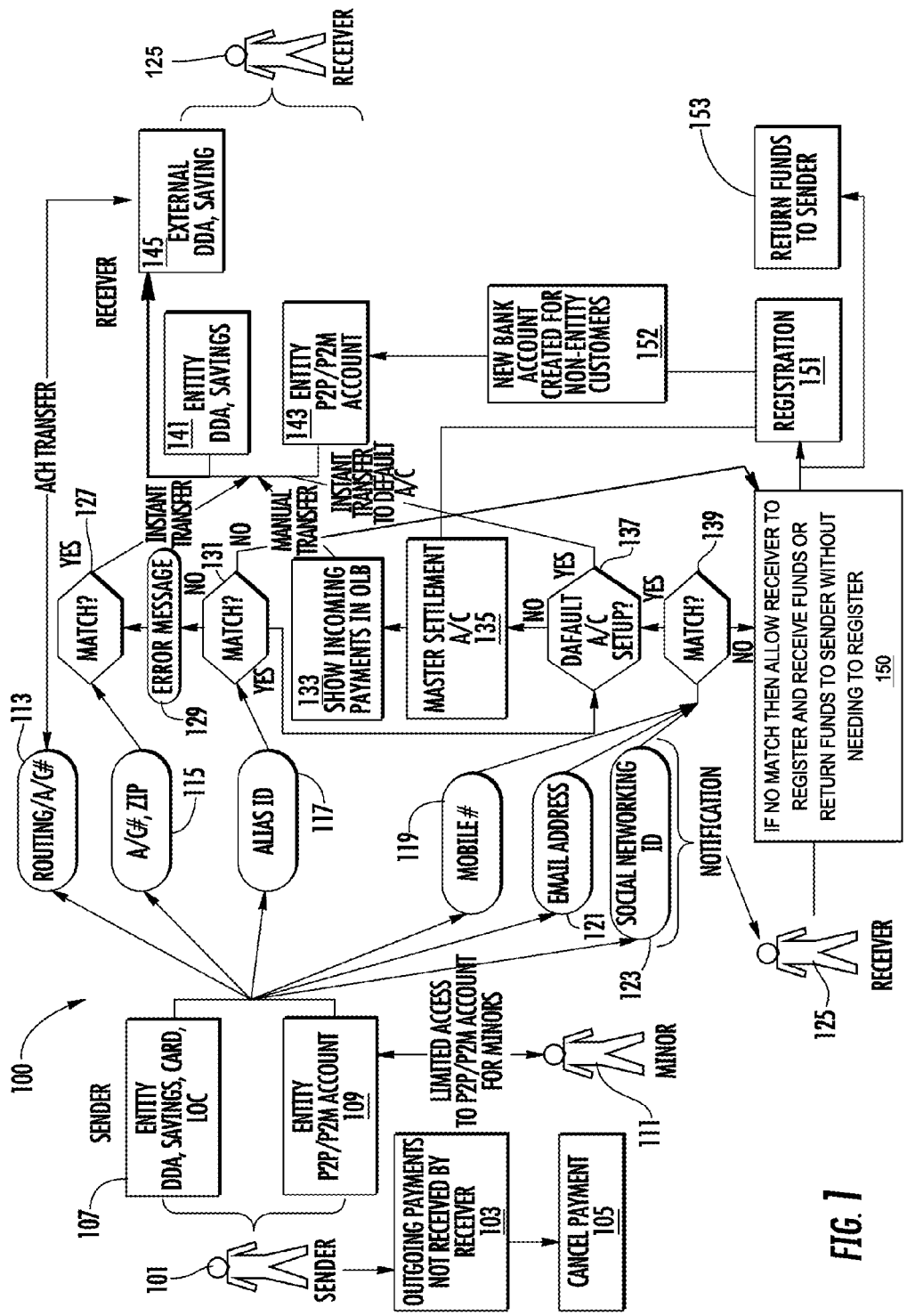
Figure 2:
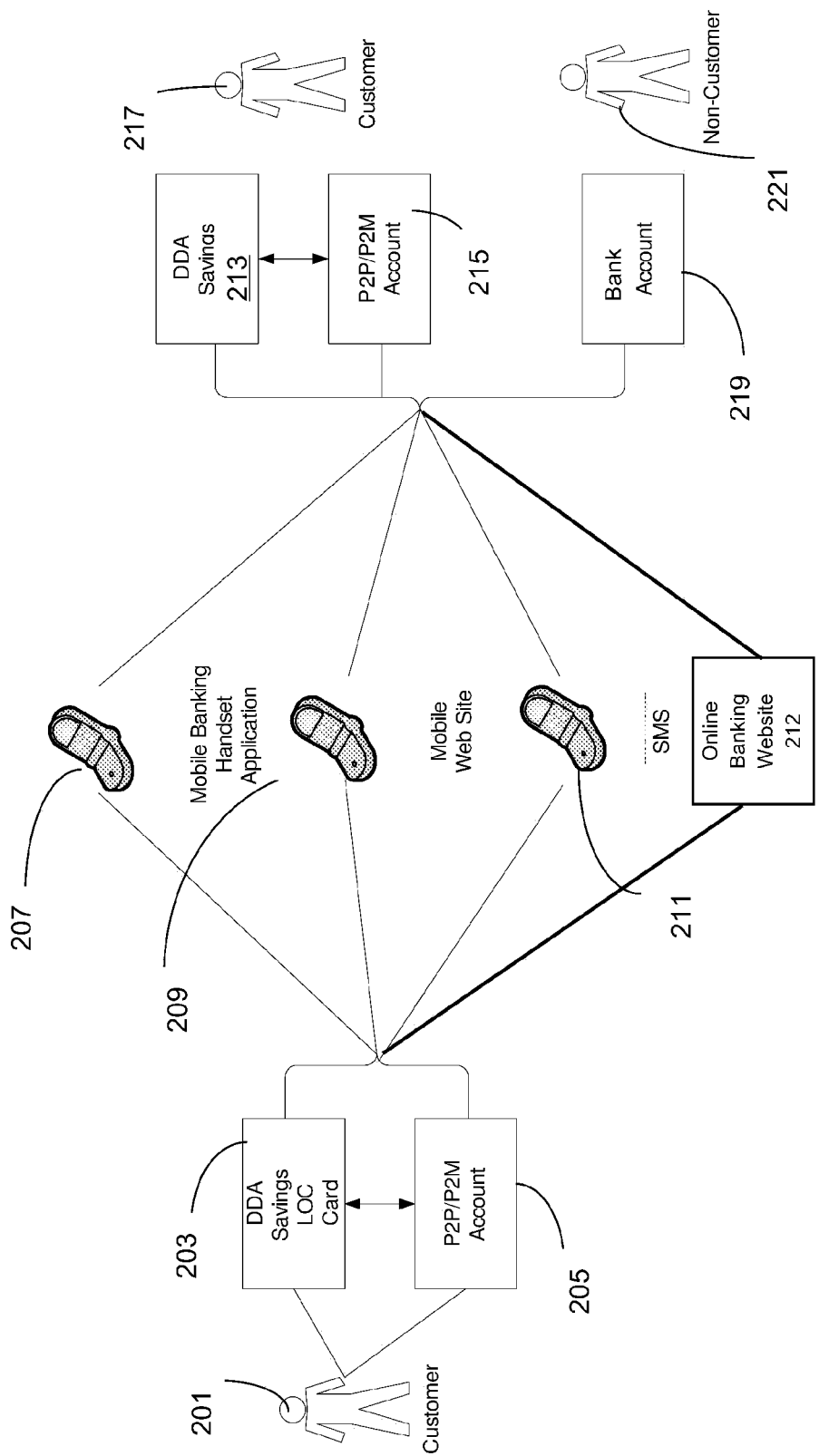
Figure 3:
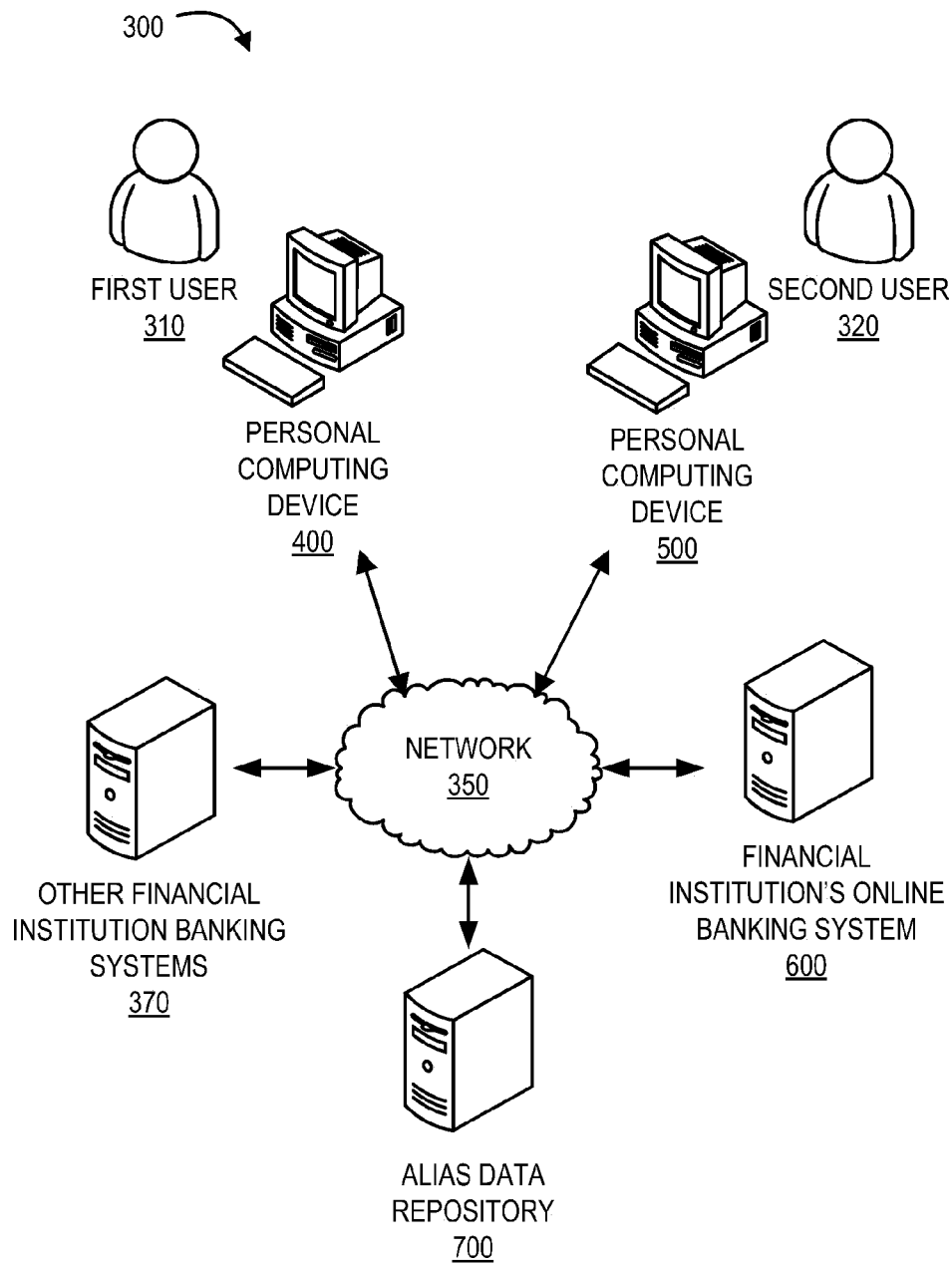
Figure 4:
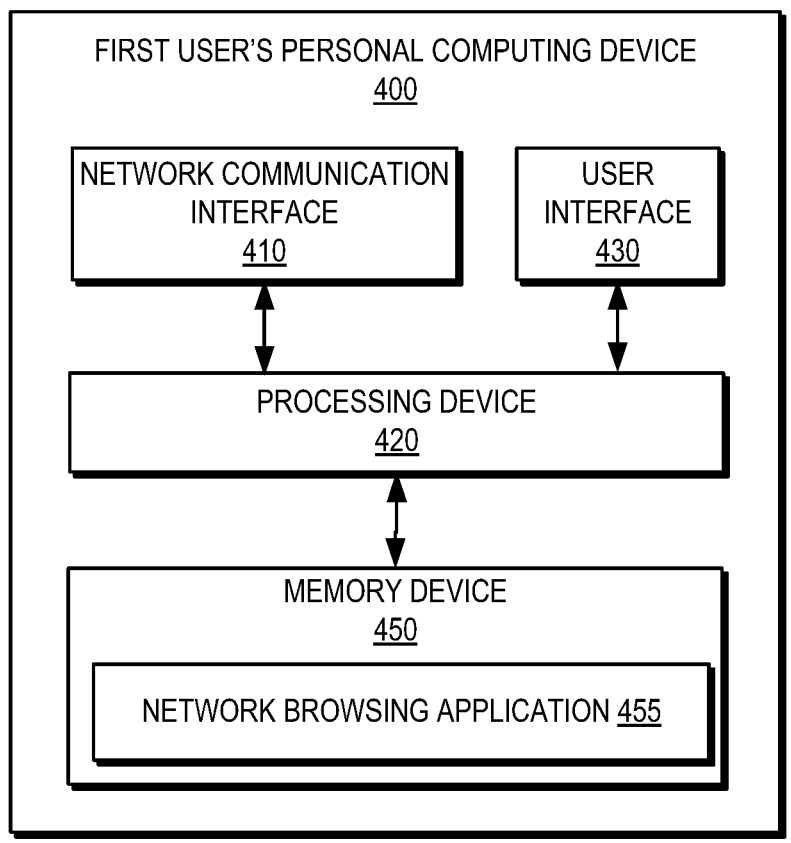
Figure 5:
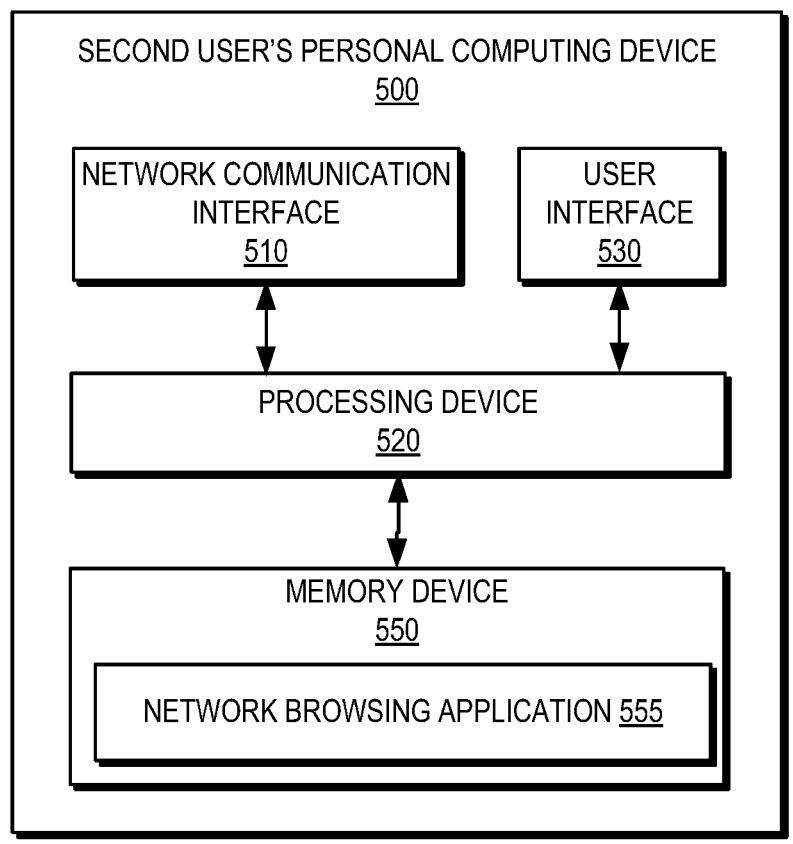
Figure 6:
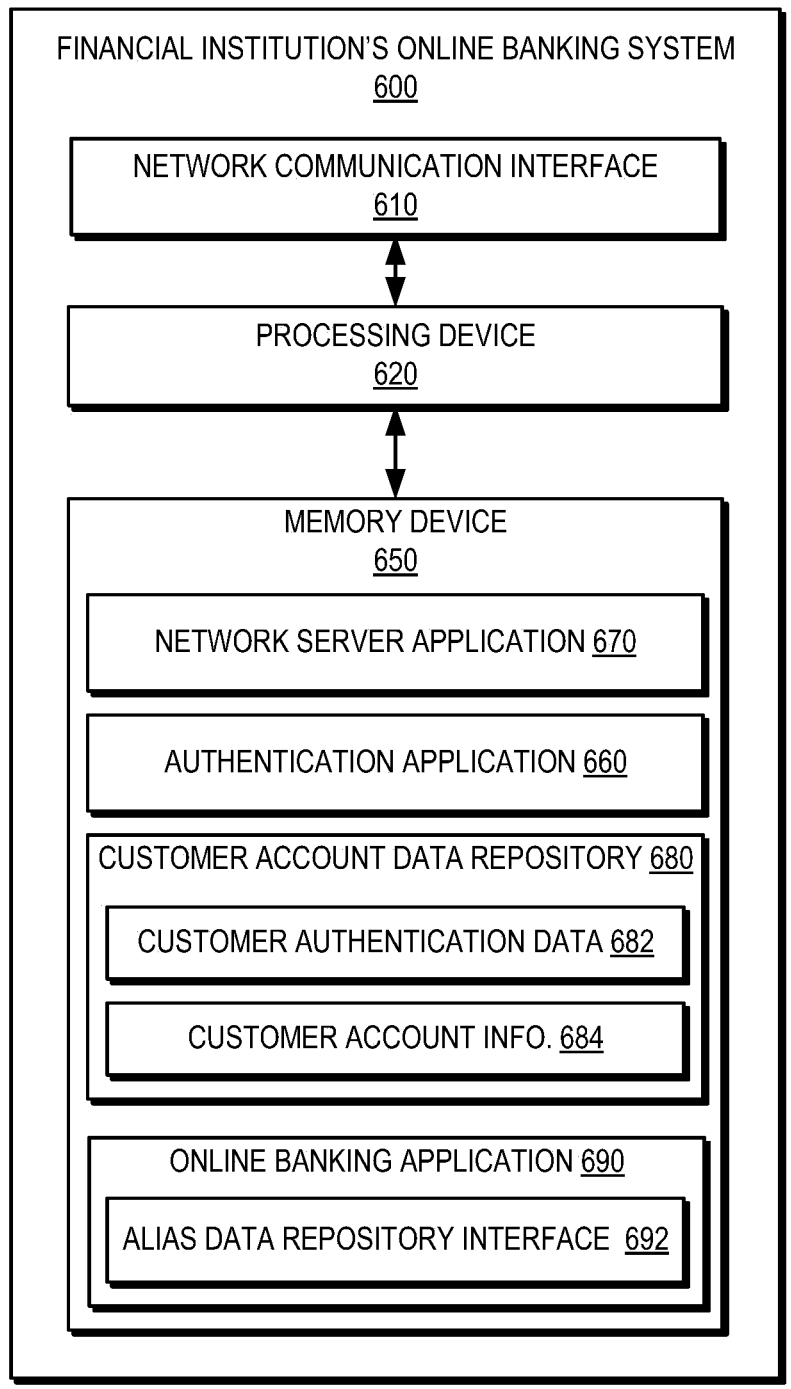
Figure 7:
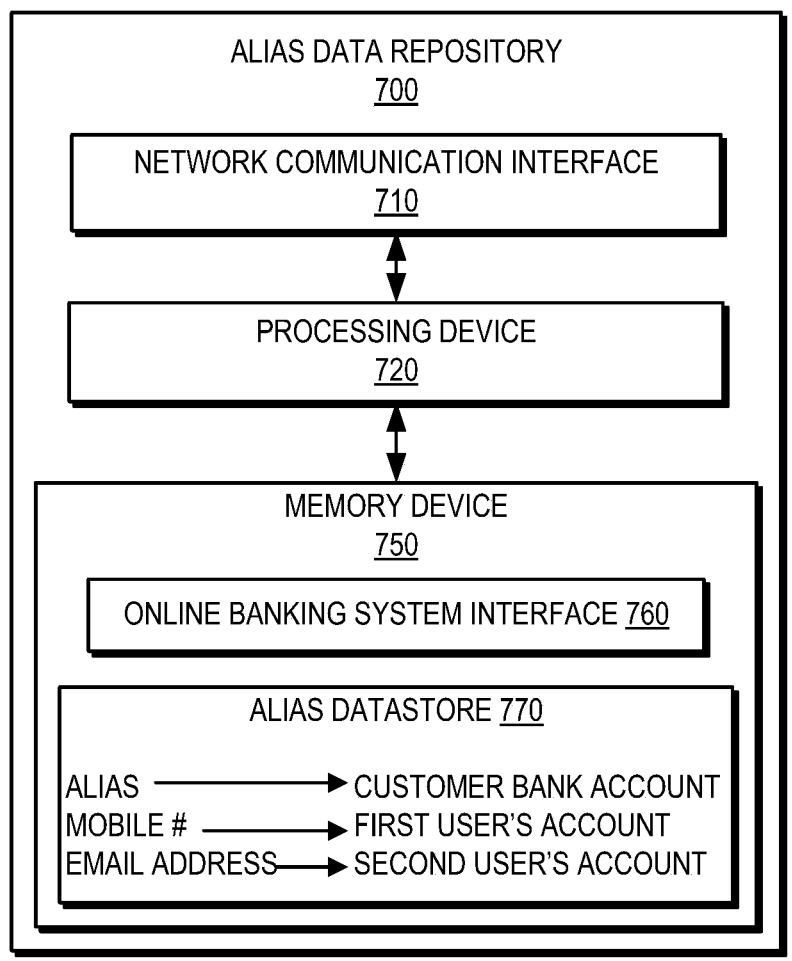
Figure 10B:
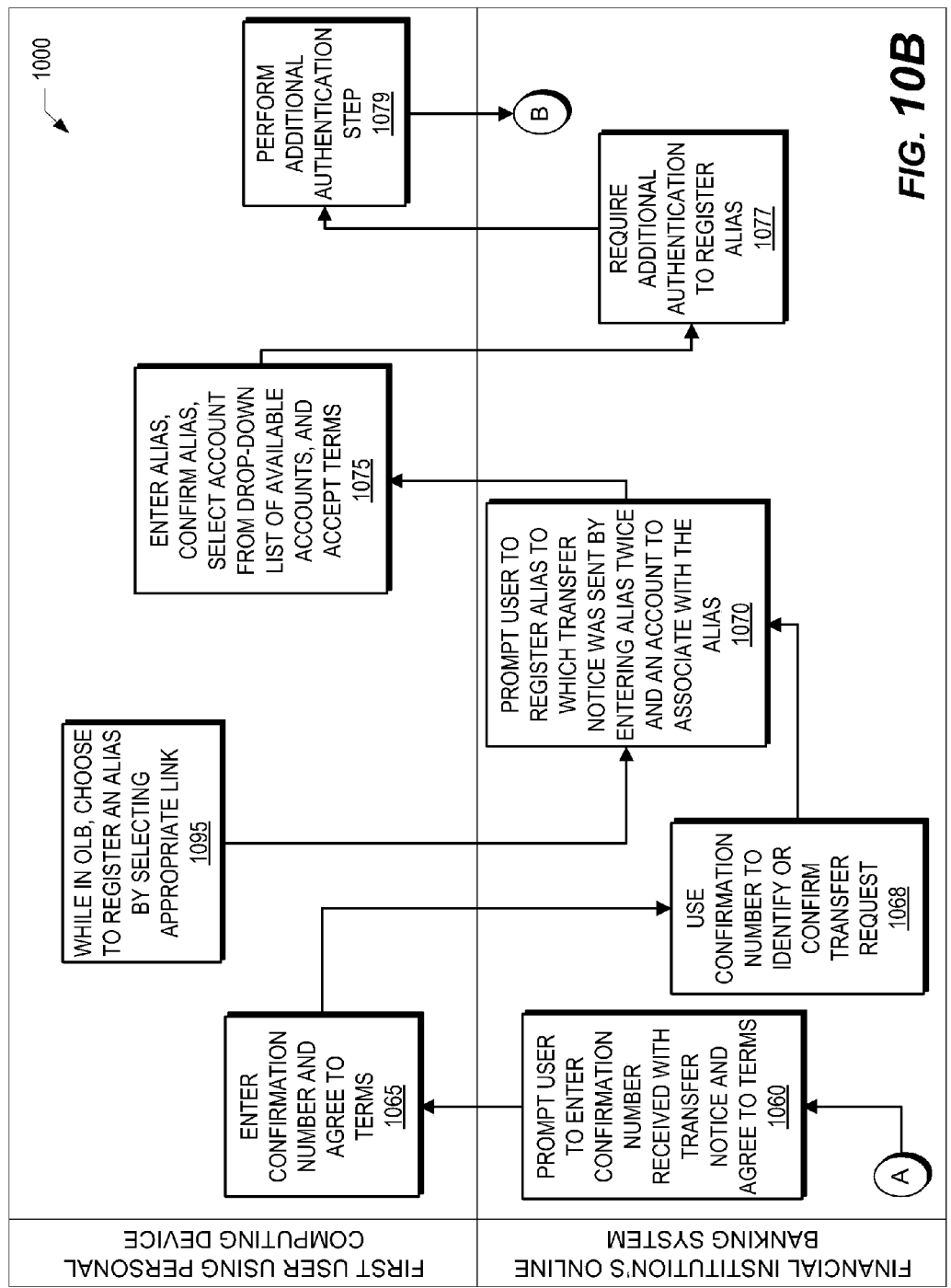
Figure 11E:
Figure 12A:
Figure 12B:
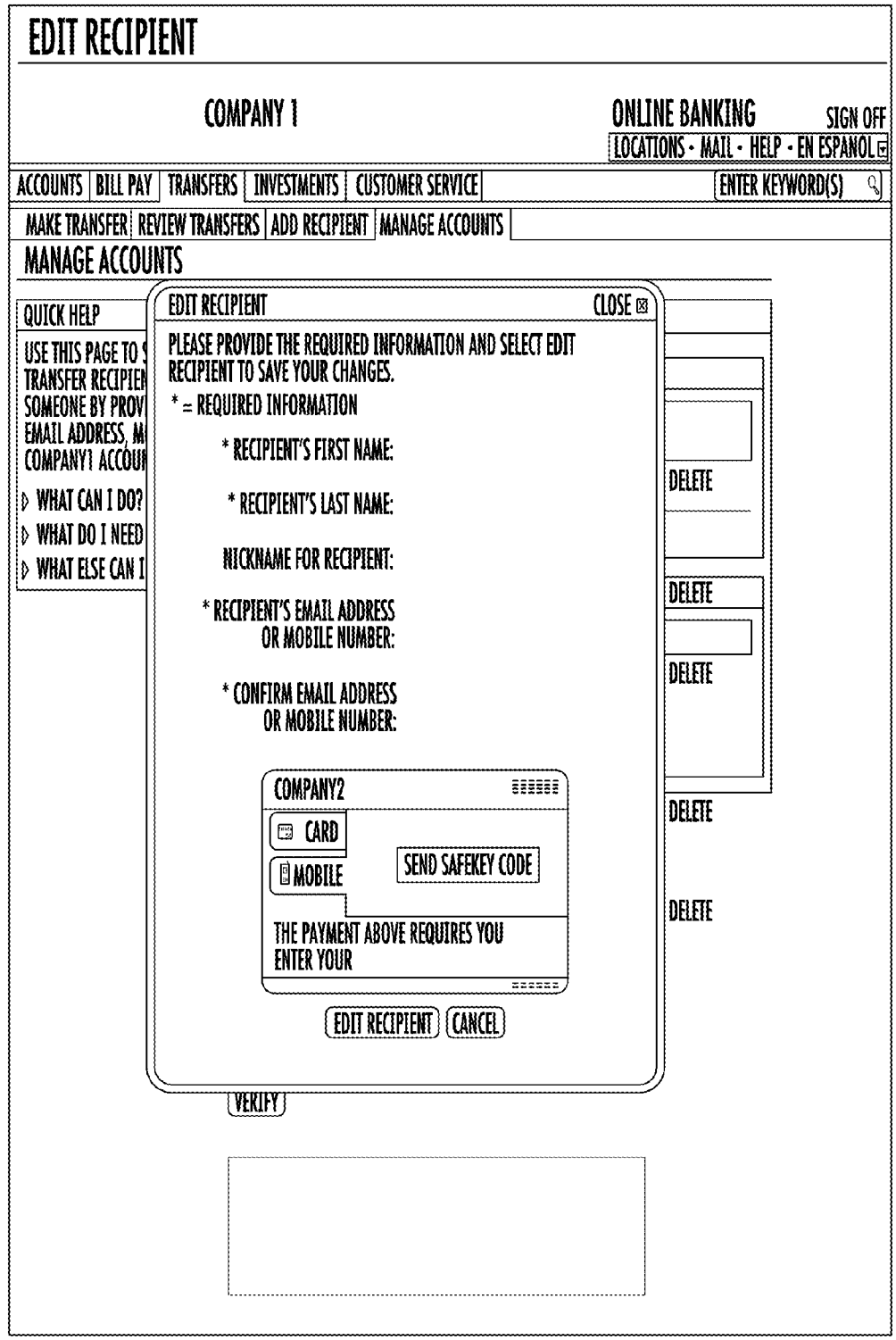

Having thus described embodiments of the invention in general terms, reference will now be made the accompanying drawings, wherein:

FIG. 1 is a combination flowchart and block diagram of a system and method for making P2P payments in accordance with example embodiment of the invention;

FIG. 2 is a block diagram illustrating the various ways through which a customer may make P2P payments in accordance with various embodiments of the invention;

FIG. 3 provides a block diagram illustrating an online banking P2P payment system and environment in accordance with an embodiment of the invention;

FIG. 4 provides a block diagram illustrating the first user's personal computing device of FIG. 3, in accordance with an embodiment of the invention;

FIG. 5 provides a block diagram illustrating the second user's personal computing device of FIG. 3, in accordance with an embodiment of the invention;

FIG. 6 provides a block diagram illustrating the financial institution's online banking system of FIG. 3, in accordance with an embodiment of the invention;

FIG. 7 provides a block diagram illustrating the alias data repository of FIG. 3, in accordance with an embodiment of the invention;

FIGS. 8A-8D provide flow charts illustrating a process for sending P2P payments, in accordance with embodiments of the invention;

FIGS. 9A-9G provide screenshots of a graphical user interface used during the process described in FIGS. 8A-8D, in accordance with embodiments of the invention;

FIGS. 10A-10C provide flow charts illustrating a process for receiving P2P payments, in accordance with embodiments of the invention;

FIGS. 11A-11F provide screenshots of a graphical user interface used during the process described in FIGS. 10A-10C, in accordance with an embodiment of the invention; and FIGS. 12A-12C provide screenshots of a graphical user interface used during the processes of accessing the list of outbound transfer recipients and inbound transfer options, editing a transfer recipient's information, and deleting a transfer recipient's information, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" or "financial entity" include any organization that processes financial transactions including, but not limited to, banks, credit unions, savings and loan associations, investment companies, stock brokerages, asset management firms, insurance companies and the like. In specific embodiments of the invention, use of the term "bank," is limited to a financial entity in which account-bearing customers conduct financial transactions, such as account deposits, withdrawals, transfers and the like.

Embodiments of the present invention provide a system and method for online banking integrated person-to-person (P2P) payments. Embodiments of the invention allow customers of a financial entity to make payments directly from their accounts, whether their accounts be checking, savings, line of credit, credit card, and/or other accounts, to a payment recipient, including financial entity customers and non-financial entity customers, without having to share any confidential account information and without having to know account information for the intended payment recipient. Embodiments of the invention also allow customers and non-customers to receive payments from others directly into their financial institution accounts without requiring the customer to share account information with the payment sender. It should be noted that some embodiments of the invention allow a customer to make payments to and/or receive payments from a merchant in the same way that a customer can make payments to and/or receive payments from another person. As such, as used herein, the phrase person-to-person (P2P) is intended to include person-to-merchant (P2M), merchant-to-merchant (M2M), and merchant-to-person (M2P) unless specifically stated otherwise. Moreover, embodiments of the present invention permit a sender to send money from the sender's financial institution account directly to the recipient's financial institution account using the alias of the recipient without the involvement of an intermediary or a third party. This allows for greater security as no party apart from the sender, the recipient, and the bank is ever a part of the transfer.

FIG. 1 is a combination block diagram and flowchart providing an overview of a system and method 100 for making P2P payments, in accordance with one or more embodiments of the invention. A customer 101 with an eligible account 107, e.g., checking (demand deposit account or "DDA"), savings, money market, line of credit, credit card, etc., of a financial entity is be able to register and make use of this service. During the registration process, the customer 101 is able to set up an alias identifier (ID) 117 (or simply an "alias") that maps back to the customer's account. The alias 117 may be any unique identifier other than the customer's financial institution account number. Typically, the alias 117 is an identifier that friends, family, and/or other members of the public uniquely associate with the customer 101. For example, the alias 117 may be a mobile telephone number 119, an email address 121, a social networking ID 123, and/or the like. The embodiments of the invention described herein in the other figures generally permit the customer 101 to use either a mobile telephone number 119 or an email address 121 as the account alias, but it will be appreciated that, in view of this disclosure, other embodiments of the invention may allow use of other types of aliases.

The information provided by the customer 101 during registration of an alias may be verified to confirm that the customer 101 does have access to the mobile number 119, email address 121, social networking ID 123, or other alias 117 provided. For example, as described in greater detail below, the financial institution (or other entity that maintains a database of aliases and associates them with financial institution accounts) may send a communication to the customer 101 using the alias and require the customer 101 confirm access to the alias by responding to the notice in some way. For example, if the alias registered by the customer 101 is a mobile telephone number 119, the financial institution may send a text message to the mobile telephone number 119 with a code and then require that the customer 101 enter the code into a mobile banking or online banking application to confirm that the mobile telephone number is associated with the customer 101. Once the alias information is verified, then the alias is linked to one or more of the customer's financial institution accounts in a data repository maintained by the financial institution or some other entity that provides an alias registry service to the financial institution.

The customer 101 can also use embodiments of the invention to make payments to other entity's, such as receiver 125, using an alias of the receiver 125. In some embodiments of the invention, the customer 101 is able to set preferences for accounts to be used for outgoing payments, and default account(s) for incoming payments. In some embodiments of the invention, the financial institution places limits (e.g., maximums and/or minimums) on how much money can be sent or received over a specified period of time using P2P payment aliases, and such limits may be based on the sender, the receiver, whether the receiver is a customer of the financial institution or a partner financial institution, account history, credit ratings, customer status, whether the customer has registered the alias, and/or any other relevant information. In some embodiments, the customer 101 can also establish limits on P2P payments. For example, a customer 101 may want to set a maximum of $1000 for P2P payments where an alias is used for the recipient as opposed to an account number.

In some embodiments of the invention, the customer 101 may also have an option of opening a new P2P account 109 with the financial institution that the customer may use exclusively for making and/or receiving P2P payments. This financial entity P2P account 109 may be like any other account hosted at the financial entity and so money may be moved instantly into this account 109 through the regular online banking transfer process for moving money between a customer's accounts. This account 109 may be a type of checking account except that it may come with certain limitations, e.g., no checks, maximum balance limits, number of daily transactions or the like, and may be opened by customers by providing much less information as compared to a regular checking account. The financial entity may, at a minimum, require customers to provide certain information, such as name, address, date of birth, and social security number, in order to comply with Anti-Money Laundering (AML) regulations. Customers 101 of the financial entity may also have an option to set up P2P accounts 109 (i.e., sub-accounts) for minors 125, other dependents, or related entities. Customers 101 are able to access these accounts just like any of their other accounts. In addition, customers 101 are able to set up an online banking access ID for the minor 125 that the minor 125 may use to sign into online banking but have access only to the specific minor P2P account 109 set up for them. These P2P-specific accounts and sub-accounts are described in more detail in U.S. patent application Ser. No. 12/038,177 filed on Feb. 27, 2008 and entitled "Sub-Account Mechanism," which application was assigned to, or subject to an obligation to assign to, the same assignee of the present application at the time of filing of the present application and at the time of conception of the inventions described herein.

Referring again to FIG. 1, customers 101 of the financial entity are able to make payments to other people through any of a number of different methods. Payments may be made by a routing number/account number 113. Payments may also be made by providing an account number and an additional identifier, such as a zip code 115. If there is a match to an existing financial entity account in 127, then the funds are transferred instantly to that account. Else, an error message 129 may be generated.

In accordance with embodiments of the invention, payments may be made by providing an alias 117. In general, as described in greater detail below, the customer 101 initiates a P2P payment using an alias by communicating an alias 117 and an associated payment amount to the financial institution. The financial institution then accesses an alias database, or other type of data repository, to determine if the entered alias 117 has been registered by the alias holder and is, thereby, associated with a particular financial institution account. If the alias 117 does have a match to another customer in 131 or financial institution account of another customer 131, then the payment may be initiated to that person, as described in greater detail below. If there is no match, then either an error message 129 is generated or, if possible, the alias 117 may be used to contact the intended recipient 125 and allow this person to register the alias 117 and thereby associate the alias with a financial institution account. At any time, if outgoing payments or payment notifications are not received by a receiver (as represented by block 103), the payment may be canceled (as represented by block 105).

In some embodiments of the invention, an alias 117 may be associated with multiple financial institution accounts of the alias holder. In some such embodiments, the alias holder may be a able to establish a default account when registering the alias 117 or afterwards. Consequently, if a receiver 125 does have a default account for incoming payments in 137, then the funds may be transferred instantly to that account(s). If the receiver 125 has not set up a default account in 137 but the receiver 125 does have multiple accounts associated with the alias 117, then the funds may be moved to a master settlement account 135 and the receiver 125 may see the payment as an incoming payment within online banking 133. The receiver 125 may then be able to use the online banking application to move the funds instantly to any of the receiver's others accounts. In other embodiments, however, each alias 117 is associated only with one financial institution account and, therefore, steps 137 and 135 are not needed and the payment is deposited directly into the one financial institution account associated with the alias 117.

As further illustrated in FIG. 1, the alias 117 may be a mobile telephone number 119 and, as such, payment may be made by the customer 101 providing a mobile phone number 119 (the mobile telephone number 119 being the mobile telephone number of the intended payment recipient 125) along with an associated payment amount. This operation may perform exactly as described above for the alias 117 if there is a match in 139 on the mobile number. If there is no match in 139, then a text message may be sent to the mobile number 119 provided (as represented by block 150). If the receiver 125 of the message is an existing financial institution customer (or, in some embodiments, if the receiver 125 is a customer of a partner financial institution), then that person may be allowed to sign into their online or mobile banking account, register the phone number as illustrated by block 151 (thereby associating the phone number with a financial institution account for P2P payment purposes), and then receive funds similar to the process described above for the alias 117. If the receiver 125 is not a financial entity customer with an account eligible for receiving funds, then the receiver 125 may be given the option to sign up (as represented by block 152) for a financial institution account 141 or 143 at the financial institution or return funds to the sender (as represented by block 153).

As further illustrated in FIG. 1, the alias 117 may be an email address 121 and, as such, payment may be made by the customer 101 providing an email address 121 (the email address 121 being an email address of the intended payment recipient 125) along with an associated payment amount. This operation may perform exactly as described above for a mobile number 119 except that the notification message (with the registration or account opening option if appropriate) is sent to the email address 121 provided.

In some embodiments of the invention, payment may be made by providing a social networking ID 123, such as a unique ID associated with the receiver 125 on a particular social networking Internet site. In such a situation, the process operates in the same way as described above for mobile phone number 119 and email address 121 except the social networking platform may be used to notify the receiver based on the social networking ID 123 provided.

In all cases described above, if the receiver 125 is already a customer of the financial institution or a partner financial institution and has already registered the alias 117 provided by the sender 101, a text message, email, online banking notice, mobile banking notice, or other type of message may be sent to receiver 125 based on the alias 117 entered by the sender 101 or irrespective of information entered by sender if there is other contact information found in the receiver's profile, the notification notifying the receiver 125 of the payment. In some embodiments, the receiver 125 may be allowed to reject or re-route the payment. In some embodiments of the invention, the sender 101 is permitted to include a note to the recipient 125 along with the payment, such as a note explaining to the recipient what the purpose of payment.

FIG. 2 is a block diagram illustrating the various ways through which a customer may make P2P payments in accordance with various embodiments of the invention. As illustrated, in some embodiments of the invention, a customer 201 who is signed up for the P2P payment service has the option to initiate P2P payments from a DDA, savings, line of credit, and/or credit card account 203 of the financial entity (and/or from a P2P-specific account 205 with the financial entity) through the financial entity's mobile banking website 209 or a mobile banking handset application 207 by providing any of the above-described alias information, e.g., phone number, email address, social networking ID, and/or other alias, along with a payment amount. In some embodiments of the invention, customers can alternatively or additionally initiate payments by sending a text message 211 to the financial entity, the text message including the receiver's phone number, email address, social networking ID, nickname, or other alias. In some embodiments, customers can alternatively or additionally use the financial institution's online banking website 212 to initiate a payment using an alias, as described in greater detail below with respect to FIGS. 3-12C. Whether via a mobile banking handset application 207, mobile website 209, short message service 211, or online banking website 212, a receiver 217 associated with the financial entity may receive funds at the receiver's financial institution account (e.g., DDA, savings, or credit account 213 or P2P-specific account 215). A receiver 221 not associated with the financial entity 221 may receive funds at the receiver's financial institution account 219 at another partner financial institution if the account is registered and associated with the alias and/or the receiver 221 may be prompted to register for the service and/or open an account with the financial institution in order to receive the payment from the sender 201.

It should be appreciated that embodiments of the invention described above permit an entity to send money to another entity even if the sending entity does not know any account information for the recipient entity and only knows a mobile telephone number or email address of the recipient entity. This can also result in better protection of personal account information. It should also be appreciated that some embodiments of the invention create a viral registration and/or account opening system that allows for customers of a financial institution to send payments to anyone outside the financial entity using an alias. In such embodiments, the non-customers are contacted using the alias and they are allowed to quickly open and/or register an account with the financial institution in order to receive the funds from the sender.

As described above, FIGS. 1 and 2 provide an overview of the alias-type P2P payment system and process of embodiments of the invention. FIGS. 3-12C, described below, provide a more detailed description of some systems and methods of implementing embodiments the invention in an online banking environment. Specifically, embodiments of the invention described below disclose a user-friendly online banking interface and associated method that may be used by a financial institution to: (1) allow customers to send P2P payments using an alias of the intended recipient; (2) allow customers to register a customer's aliases and then receive alias-type P2P payments from others; and (3) allow customers to easily manage their P2P payments.

FIG. 3 provides a block diagram illustrating an online banking P2P payment system and environment 300, in accordance with an embodiment of the invention. As illustrated in FIG. 3, the P2P payment environment 100 includes a first user 310 and a second user 320 where one user wants to send funds to the other user. A user of the system may be a person, but may also be a business (e.g., a merchant) or any other entity capable of sending or receiving money.

The environment 300 also includes a personal computing device 400 and 500 for the first user 310 and second user 320, respectively. Each personal computing device may be any device that employs a processor and memory and can perform computing functions, such as a personal computer or a mobile device. As used herein, a "mobile device" is any mobile communication device, such as a cellular telecommunications device (i.e., a cell phone or mobile phone), personal digital assistant (PDA), a mobile Internet accessing device, or other mobile device.

The personal computing devices 400 and 500 are configured to communicate over a network 350 with a financial institution's online banking system 600 and, in some cases, one or more other financial institution banking systems. The first user's personal computing device 400, the second user's personal computing device 500, the financial institution's online banking system 600, an alias data repository 700, and any other participating financial institution's banking systems 370 are each described in greater detail below with reference to FIGS. 4-7. The network 350 may include a local area network (LAN), a wide area network (WAN), and/or a global area network (GAN). The network 350 may provide for wireline, wireless, or a combination of wireline and wireless communication between devices in the network. In one embodiment, the network 350 includes the Internet.

In general, a personal computing device 400 is configured to connect with the network 350 to log the first user 310 into an online banking system 600. The online banking system 600 involves authentication of a first user in order to access the first user's account on the online banking system 600. For example, the online banking system 600 is a system where a first user 310 logs into his/her account such that the first user 310 or other entity can access data that is associated with the first user 310. For example, in one embodiment of the invention, the online system 600 is an online banking system maintained by a financial institution. In such an embodiment, the first user 310 can use the personal computing device 400 to log into the online banking system to access the first user online banking account. Logging into the online banking system 600 generally requires that the first user 310 authenticate his/her identity using a user name, a passcode, a cookie, a biometric identifier, a private key, a token, and/or another authentication mechanism that is provided by the first user 310 to the online banking system 600 via the personal computing device 400.

The financial institution's online banking system 600 is in network communication with other devices, such as other financial institutions' banking systems 370, an alias data repository 700, and a second personal computing device 500 that is configured to communicate with the network 350 to log a second user 320 into the online banking system 600.

In some embodiments of the invention, the alias data repository 700 is configured to be controlled and managed by one or more third-party data providers (not shown in FIG. 3) over the network 350. In other embodiments, the alias data repository 700 is configured to be controlled and managed over the network 350 by the same entity that maintains the financial institution's online banking system 300. In other embodiments, the alias data repository 700 is configured to be controlled and managed over the network 350 by the financial institution implementing the online payment system of the present invention. In still other embodiments, the alias data repository 700 is a part of the online banking system 600.

Referring now to FIG. 4, the personal computing device 400 associated with the first user 310 includes various features, such as a network communication interface 410, a processing device 420, a user interface 430, and a memory device 450. The network communication interface 410 includes a device that allows the personal computing device 400 to communicate over the network 350 (shown in FIG. 3). In addition, a network browsing application 455 is stored in the memory device 450. The network browsing application 455 provides for the first user to establish network communication with the online banking system 600 (shown in FIG. 4) for the purpose of initiating online payment, in accordance with embodiments of the present invention.

Referring now to FIG. 5, the personal computing device 500 associated with the second user 320 also includes various features, such as a network communication interface 510, a processing device 520, a user interface 530, and a memory device 550. The network communication interface 510 includes a device that allows the personal computing device 500 to communicate over the network 350 (shown in FIG. 3). In addition, a network browsing application 555 is stored in the memory device 550. The network browsing application 455 provides for the second user to establish network communication for the purpose of registering and account and/or alias with the online payment system and/or receiving online payment, in accordance with embodiments of the present invention.

As used herein, a "processing device," such as the processing device 420 or the processing device 520, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 420 or 520 may further include functionality to operate one or more software programs based on computer-executable program code thereof, which may be stored in a memory. As the phrase is used herein, a processing device 420 or 520 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 430 or 530 generally includes a plurality of interface devices that allow a customer to input commands and data to direct the processing device to execute instructions. As such, the user interface 430 or 530 employs certain input and output devices to input data received from the first user 310 or second user 320 or output data to the first user 310 or second user 320. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 450 or 550 generally refers to a device or combination of devices that store one or more forms of computer-readable media and/or computer-executable program code/instructions. Computer-readable media is defined in greater detail below. For example, in one embodiment, the memory device 450 or 550 includes any computer memory that provides an actual or virtual space to temporarily or permanently store data and/or commands provided to the processing device 420 or 520 when it carries out its functions described herein.

FIG. 6 provides a block diagram illustrating the online banking system 600 in greater detail, in accordance with embodiments of the invention. As illustrated in FIG. 6, in one embodiment of the invention, the online banking system 600 includes a processing device 620 operatively coupled to a network communication interface 610 and a memory device 650. In certain embodiments, the online banking system 600 is operated by a first entity, such as a financial institution, while in other embodiments, the online banking system 600 is operated by an entity other than a financial institution.

It should be understood that the memory device 650 may include one or more databases or other data structures/repositories. The memory device 650 also includes computer-executable program code that instructs the processing device 620 to operate the network communication interface 610 to perform certain communication functions of the online banking system 600 described herein. For example, in one embodiment of the online banking system 600, the memory device 650 includes, but is not limited to, a network server application 670, an authentication application 660, a customer account data repository 680, which includes customer authentication data 680 and customer account information 684, and an online banking application 690, which includes an alias data repository interface 692 and other computer-executable instructions or other data. The computer-executable program code of the network server application 670, the authentication application 660, or the online banking application 690 may instruct the processing device 620 to perform certain logic, data-processing, and data-storing functions of the online system 600 described herein, as well as communication functions of the online banking system 600.

In one embodiment, the customer account data repository 680 includes customer authentication data 682 and customer account information 684. The network server application 670, the authentication application 660, and the online banking application 690 are configured to implement customer account information 684, the customer authentication data 682, and the alias data repository interface 692 when authenticating the customer 101 to the online banking system 600. The customer account information 684, the customer authentication data 682, and the alias data repository interface 692 are discussed in more detail in a later section.

As used herein, a "communication interface" generally includes a modem, server, transceiver, and/or other device for communicating with other devices on a network, and/or a user interface for communicating with one or more customers. Referring again to FIG. 6, the network communication interface 610 is a communication interface having one or more communication devices configured to communicate with one or more other devices on the network 350, such as the personal computing device 400 or 500, the online banking system 600, the other financial institution banking systems 370, and the alias data repository 700. The processing device 620 is configured to use the network communication interface 610 to transmit and/or receive data and/or commands to and/or from the other devices connected to the network 350.

FIG. 7 provides a block diagram illustrating an alias data repository 700, in accordance with an embodiment of the invention. In one embodiment of the invention, the alias data repository 700 is operated by a second entity that is a different or separate entity from the first entity (e.g., the financial institution) that, in one embodiment of the invention, implements the online banking system 600. In one embodiment, the alias data repository 700 could be part of the online banking system 600. In another embodiment, the alias data repository 700 is a distinct entity from the online banking system 600. As illustrated in FIG. 7, the alias data repository 700 generally includes, but is not limited to, a network communication interface 710, a processing device 720, and a memory device 750. The processing device 720 is operatively coupled to the network communication interface 710 and the memory device 750. In one embodiment of the alias data repository 700, the memory device 750 stores, but is not limited to, an online banking system interface 760 and an alias data store 770. The alias data store 770 stores data including, but not limited to, an alias for the customer's financial institution account, mobile number or email address for the first user's 310 account, and a mobile number and/or email address for the second user's 320 account. In one embodiment of the invention, both the online banking system interface 760 and the alias data store 770 may associate with applications having computer-executable program code that instructs the processing device 720 to operate the network communication interface 710 to perform certain communication functions involving the alias data store 770 described herein. In one embodiment, the computer-executable program code of an application associated with the alias data store 770 may also instruct the processing device 720 to perform certain logic, data processing, and data storing functions of the application associated with the alias data store 770 described herein. An alias, as defined in this invention, is not limited to just a mobile device number or an email address.

The network communication interface 710 is a communication interface having one or more communication devices configured to communicate with one or more other devices on the network 350. The processing device 720 is configured to use the network communication interface 710 to receive information from and/or provide information and commands to a personal computing device 400 or 500, other financial institution banking systems 370, the alias data repository 700, the online banking system 600 and/or other devices via the network 350. In some embodiments, the processing device 720 also uses the network communication interface 710 to access other devices on the network 350, such as one or more web servers of one or more third-party data providers. In some embodiments, one or more of the devices described herein may be operated by a second entity so that the third-party controls the various functions involving the alias data repository 700. For example, in one embodiment of the invention, although the online system 600 is operated by a first entity (e.g., a financial institution), a second entity operates the alias data repository 700 that stores the alias details for the customer's financial institution accounts and other information about customers.

As described above, the processing device 720 is configured to use the network communication interface 710 to gather data from the various data sources. The processing device 720 stores the data that it receives in the memory device 750. In this regard, in one embodiment of the invention, the memory device 750 includes datastores that include, for example: (1) aliases for customer financial institution account numbers and routing information, (2) information about sending and receiving users' mobile device numbers, email addresses, or other contact information, which may have been received from the online banking system 600; (3) a list of customer IDs or authentication data received from the online banking system 600; and/or (4) customer credentials (e.g., a customer ID) received from the customer's personal computing device 400 or received from the online system 300 in response to the customer accessing the online banking system 600.

FIGS. 8A-8D provide flow charts illustrating a process 800 for sending P2P payments using an alias, in accordance with an embodiment of the invention. FIGS. 8A-8D illustrate the flow chart in terms of "swim lanes" associated with entities which may perform the operations in each respective swim lane. The entities illustrated in the exemplary Figures are a financial institution's online banking system, a first user using a first personal computing device, an alias data repository, and a second user using a second personal computing device. However, it should be noted that other entities could also be involved and some embodiments of the invention may not be limited to the four entities illustrated in FIGS. 8A-8D. Additionally, it should be understood that, in other embodiments of the invention, the entities need not be required to perform the actions illustrated in each respective swim lane. For example, some of the process steps described herein may be performed by the first entity (or other entities) even though the element may be illustrated as in the swim lane of the second entity. Similarly, in some embodiments, some of the process steps may be performed by the second entity (or other entities) even though the element may be illustrated as in the swim lane of the first entity.

Figure 8A:
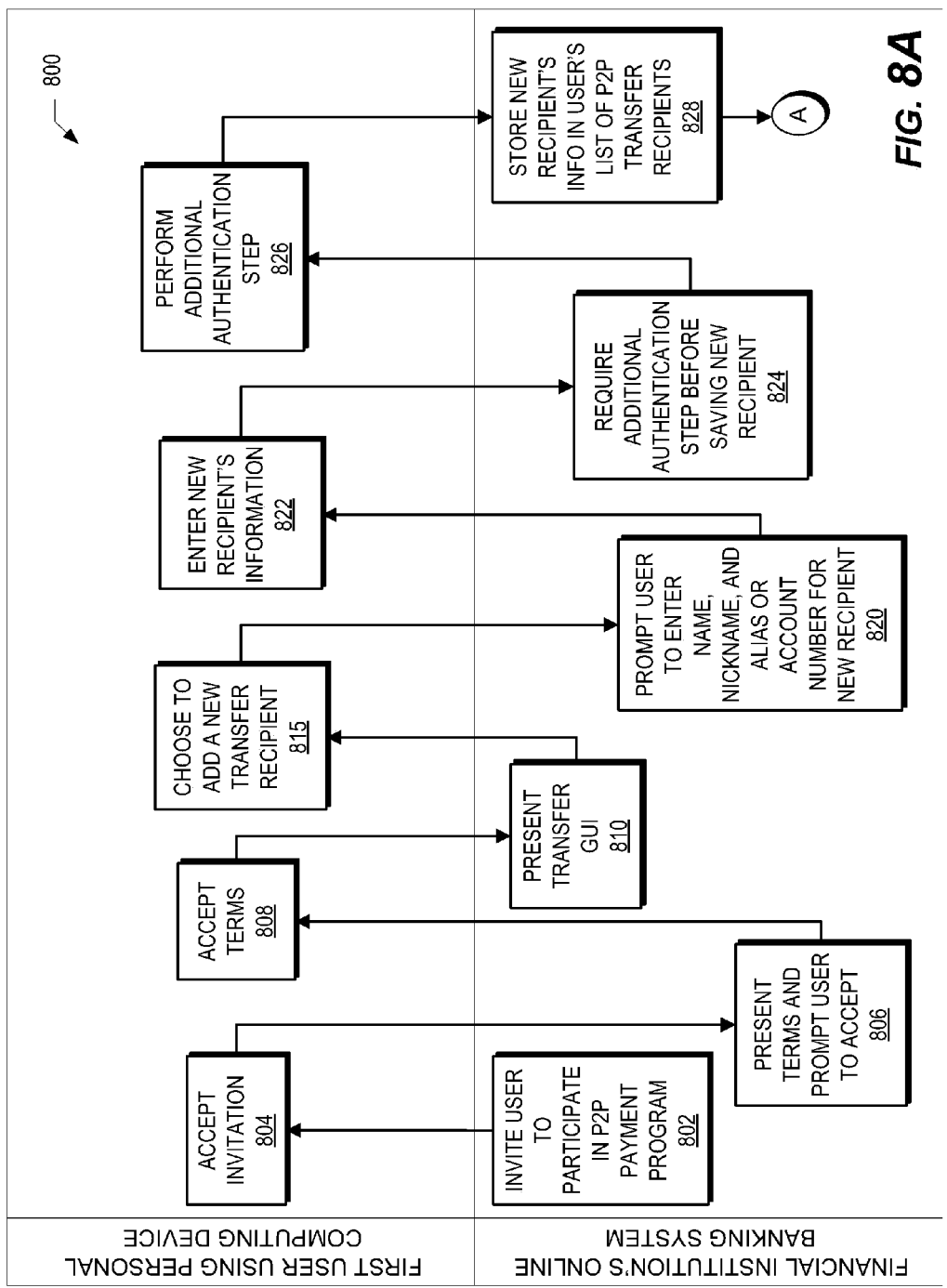
Figure 9A:
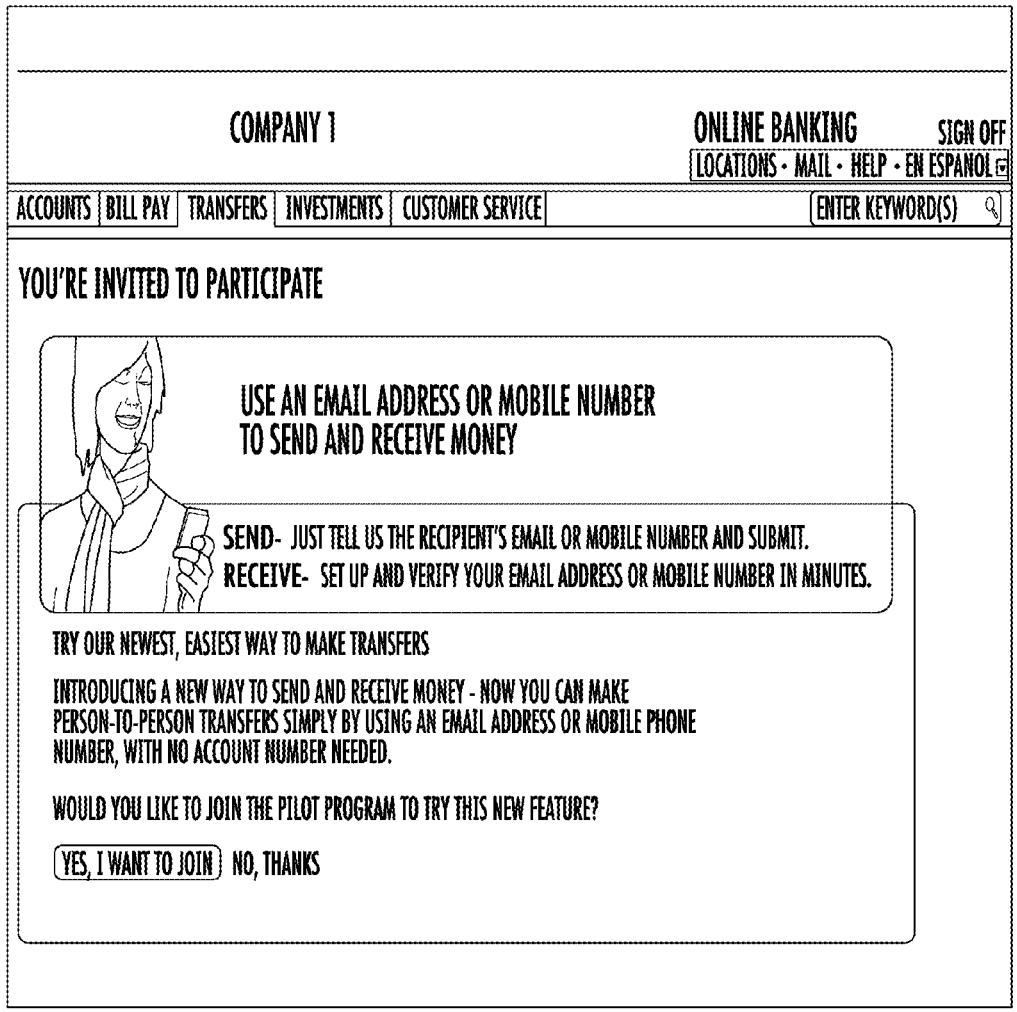

The process begins at block 802 of FIG. 8A where a financial institution's online banking system 600 invites a user to participate in a P2P payment program. FIG. 9A provides a screenshot of a graphical user interface used during the process of inviting a user to participate in a P2P payment program. In the illustrated embodiment, the screenshot is located under the "Transfers" tab on a first user's online banking homepage. Although in other embodiments the information depicted in the screenshot of FIG. 9A may be presented elsewhere within the online banking system. In certain embodiments, the page illustrated in the screenshot is available after the first user has logged into the first user's online banking account. In another embodiment, the page illustrated in the screenshot may be available before the first user has logged into the first user's online banking account. The other tabs on the first user's online banking homepage are a tab related to accounts, a tab related to paying bills, a tab related to investments and a tab related to customer service. In one embodiment shown in FIG. 9A, the online banking system 600 indicates to the first user that he or she is invited to participate in the P2P transfer service via an alias. The information provided in the screenshot of FIG. 9A is configured to inform the first user that he or she can send money to a recipient's email address or mobile number or, in other embodiments, some other alias and can receive money using just an email address or mobile number or, in other embodiments, another alias as identifying information. The online banking system 600 informs the first user in FIG. 9A that the first user can send money to a second user by submitting to the online banking system 600 the second user's email address or mobile number. As shown in FIG. 9A, the online banking system 600 informs the first user that the first user can receive money from a second user by setting up the first user's P2P account on the online banking system 600 and verifying the first user's email address or mobile number. As shown in FIG. 9A, the online banking system 600 also informs the user that the P2P service is the newest and easiest way to make transfers, and that money can be transferred without providing a recipient's account number. As shown in FIG. 9A, the online banking system 600 finally asks the first user whether he or she would like to try this P2P feature. As shown in FIG. 9A, the online banking system 600 provides two buttons for the first user to communicate his or her decision to the online banking system 600. A first user can activate the "Yes, I want to Join" button if the first user wishes to initiate the process of using the P2P service. Alternatively, the first user can activate the "No thanks" button if the first user wishes to decline the invitation extended by the online banking system 600. In certain embodiments of the invention, the online banking system 600 only invites certain existing online banking customers who fit certain criteria, including, but not limited to, pre-determined minimum account balance, number of years since the customer first opened an account, customer status, etc. Thus, in such embodiments, the information provided in the screenshot of FIG. 9A may only be accessible to those qualified customers as determined by the financial institution.

Returning to FIG. 8A, the process then moves to block 804 where the first user 310 using personal computing device 400 accepts the invitation that is shown on FIG. 9A by activating the button that reads "Yes, I Want to Join."

Figure 9B:

The process then moves to block 806 of FIG. 8A where the online banking system 600 presents to the first user the terms of the P2P transfer feature that will govern the transfer of funds. A screenshot for this process is shown in FIG. 9B. FIG. 9B shows that the online banking system 600 informs the user of the merits of using the P2P transfer service. As shown in FIG. 9B, these merits include, but are not limited to, making person-to-person transfers of money by using an email address or phone number, without the need of providing an account number. Additionally, the information provided in the screenshot depicted in FIG. 9B informs the first user that a payment or assessment is associated with transferring funds to another person using the recipient's mobile number or email address or other alias. The online banking system 600 also informs the first user that the amount of any payment is disclosed prior to making the P2P transfer via alias. The online banking system 600 also informs the first user that he or she can read more details about this payment in the service agreement that is linked into the page displayed as a screenshot in FIG. 9B. The online banking system 600 also informs the first user that there may be dollar amounts and other limits that apply for these P2P transfers via alias. As shown in FIG. 9B, the online banking system 600 further informs the first user that the first user may find in the service agreement applicable daily cut off times and delivery times for making these P2P transfers via alias. The information provided in the screenshot of FIG. 9B also informs the first user that no payment is associated with transferring funds to another person if the first user provides the recipient's account number. In the illustrated embodiment the recipient's account number must be an account associated with the financial institution implementing the online banking system, however, in other embodiments the recipient's account number may be an account number associated with another financial institution. FIG. 9B also illustrates a confirmation check box which the first user may activate if the first user confirms that he or she a) has read and agrees to the terms of the service agreement, including the terms of the Email/Mobile Network Transfer section; b) consents to receive email and automated text messages about Email/Mobile Transfers; c) will only register mobile numbers where he or she is the account holder; or if he or she is not the account holder, then he or she has the account holder's permission to register that mobile number; and d) will obtain the consent of the person to whom he or she wants to send a Mobile Transfer text message to receive the automated text message. As shown in FIG. 9B, the online banking system 600 is configured to provide the service agreement label as a hyperlink or some other activatable form, which may be activated so that the user can read the service agreement that governs the P2P transfer via alias. As shown in FIG. 9B, the online banking system 600 provides a checkbox that the first user has to click to confirm he or she has met each of the four requirements listed above. Until the first user activates this checkbox to confirm that he or she meets the four requirements listed above, the online banking system 600 provides a non-activatable "I Agree" button and an activatable "I Don't Agree" button. If the first user activates the "I Don't Agree" button, the online banking system 600 will not permit the first user to continue with setting up the P2P transfer via alias. Once the first user activates the confirmation check box, the online banking system 600 will turn the non-activatable "I Agree" button into a activatable "I Agree" button. Then, the user still has a choice of either activating the "I Agree" button or activating the "I Don't Agree" button. If the user activates the "I Don't Agree" button, the online banking system 600 will not permit the first user to continue with setting up the P2P payment transfer via alias. FIG. 9B also shows that the first user can get help about learning about the P2P transfer process or the service agreement by texting a code to a number listed on the page. FIG. 9B also shows that the first user can cancel the first user's plan by texting a code to a number listed on the page. FIG. 9B also shows that the first user can call a number listed on the webpage to get more help.

Returning to FIG. 8A, the process then moves to block 808 of FIG. 8A. The first user accepts the terms of the P2P service by activating the checkbox that confirms that the first user meets all the four requirement described in the previous paragraph, and then activating the "I Agree" button to indicate the first user's willingness to proceed with setting up the P2P transfer via alias.

The process then moves to block 810 of FIG. 8A where the online banking system 600 presents a transfer GUI so that the first user can input all the information required to make the transfer. FIG. 9C shows this transfer GUI where the online banking system 600 presents four sub-tabs under the tab heading. These four sub-tabs are a sub-tab for a making a transfer, a sub-tab for reviewing transfers, a sub-tab for adding recipients, and a sub-tab for managing accounts. FIG. 9C also shows that under the sub-tab for making transfers, the first user has the option of making a transfer within the financial institution by activating a corresponding tab and the first user also has the option of making a transfer outside the financial institution by activating the corresponding tab. As shown in FIG. 9C, the online banking system 600 also presents activatable hyperlinks for adding a new transfer recipient, setting up and starting the use of the P2P feature via alias, and for learning more about the P2P feature via alias. As shown in FIG. 9C, the online banking system 600 also presents a help box that is configured to provide hyperlinks to help information, including a link to (1) what the first user can do using the online banking system 600, (2) what the first user needs to know, and (3) what else the first user can do using the online banking system 600. As shown in FIG. 9C, the online banking system 600 also presents a message to the first user that transferring money within the bank is fast and free. As shown in FIG. 9C, the online banking system 600 also indicates to the customer that the feature of making a P2P transfer using a recipient's email address or mobile number is a new feature.

Referring again to FIG. 8A, the process then moves to block 815 of FIG. 8A. The first user chooses to add a new transfer recipient to their P2P profile. Adding a new transfer recipient may be accomplished by activating the "add recipient" sub-tab shown on the screenshot of FIG. 9C. By doing so, the first user indicates that the first user wishes to add a new transfer recipient. By doing so, the first user also indicates that the intended recipient is not listed on the drop-down list shown in FIG. 9C which is presented when the first user activates the drop-down list, entitled "To", that includes all the available recipients/destinations to whom the first user can transfer money.

Returning once again to FIG. 8A, the process then moves to block 820 where the user is prompted to enter new recipient information including, but not necessarily limited to, the name of the recipient, the nickname of the recipient and the alias or account number for the new recipient. FIG. 9D provides for the corresponding screenshot in the online banking system 600 for adding a new recipient. The screenshot of FIG. 9D may be displayed by activating the "Add Recipient" sub-tab. As shown in FIG. 9D, the online banking system 600 prompts the first user to enter the intended recipient's first name and last name in corresponding textboxes. In one embodiment, the page displays an indicator, such as an asterisk or the like, that indicates that information fields are required to be completed by the user, as opposed to optional fields which are not designated with the indicator. Additionally, the screenshot of FIG. 9D is configured to prompt the first user to optionally enter the intended recipient's nickname in a textbox. The online banking system 600 is configured to display first and second transfer method radio buttons for choosing between alternate transfer methods. First radio button is configured to allow for the first user to indicate that he or she wants to transfer money using the intended recipient's email address or mobile number or, in alternate embodiments, some other alias, and second radio button is configured to allow the first user to indicate that he or she wants to transfer money using an intended recipient's financial institution account number. Activating the first radio button, as shown, provides for display of entry fields for the new recipient's email address or mobile telephone number. The screenshot/page of FIG. 9D also provides an entry field for re-entering the intended recipient's email address or mobile device number as a confirmation step. Activating the second radio button, as not shown in FIG. 9D, provides for display of entry fields for the new recipients account number. In one embodiment, the online banking system 600 also presents a help box that is configured to provide hyperlinks to help information, including a link to (1) what the first user can do using the online banking system 600, (2) what the first user needs to know, and (3) what else the first user can do using the online banking system 600. In one embodiment, the online banking system 600 also presents two buttons, an first button to cancel the process of adding a new recipient, and a second button to add a new recipient. The second button is only activatable after the first user enters all the required information on the page displayed in FIG. 9D and is authenticated by the widget displayed in FIG. 9D and discussed infra.

Returning once again to the flow of FIG. 8A, the process then moves to block 822 at which point the first user enters the new recipient's information in the appropriate fields. As shown in FIG. 9D, the first user enters the first and last name of the new recipient in the associated fields, Additionally, in optional embodiments, the first user may enters the nickname of the new recipient in the designated field. This nickname can be any name that the first user chooses to associate with the intended recipient for the purpose of subsequently identifying the recipient based on the nickname. In addition, the first user chooses the desired transfer method from among the options presented by the online banking system 600. In one embodiment, the first user activates the radio button indicating the first user wishes to make the transfer using the intended recipient's email address or mobile device number. In such embodiments, the first user enters the intended recipient's email address or mobile device number in the designated fields and re-enters the same in the designated confirmation field. In another embodiment, the first user activates the radio button indicating the first user wishes to make the transfer using the intended recipient's account number. In such embodiments, the first user enters the intended recipient's account number in the designated field and re-enters the same in the designated confirmation field.

Referring again to FIG. 8A, the process then moves to block 824 in which additional authentication may be required prior to adding the new recipient to the database. As illustrated in the screenshot of FIG. 9D, the online banking system 600 displays a widget, which serves as an additional authenticating step before adding the information of the new intended recipient to the database. The online banking system 600 indicates to the first user that by activating the button for a sending a code, the first user will receive a code on his or her mobile device.

Returning again to FIG. 8A, the process then moves to block 826 of FIG. 8A, in which the additional authentication step is completed. As indicated on the screenshot shown in FIG. 9D, the first user activates the widget's button for sending a code to the first user's mobile device. The first user then receives on his mobile device the code that he must input into an entry field in the widget, which is displayed based on activating the "Send code now" button. Once the first user inputs the received code into the widget and activates a button in the widget to confirm that the code is correct, the button that corresponds to adding a new recipient is activatable so that it can now be activated by the user. The user activates this button so that the online banking system 600 can store the intended recipient's information.

Returning to FIG. 8A, the process then moves to block 828 and the new intended recipient's information is stored in the first user's list of P2P transfer via alias recipients.

Figure 9E:
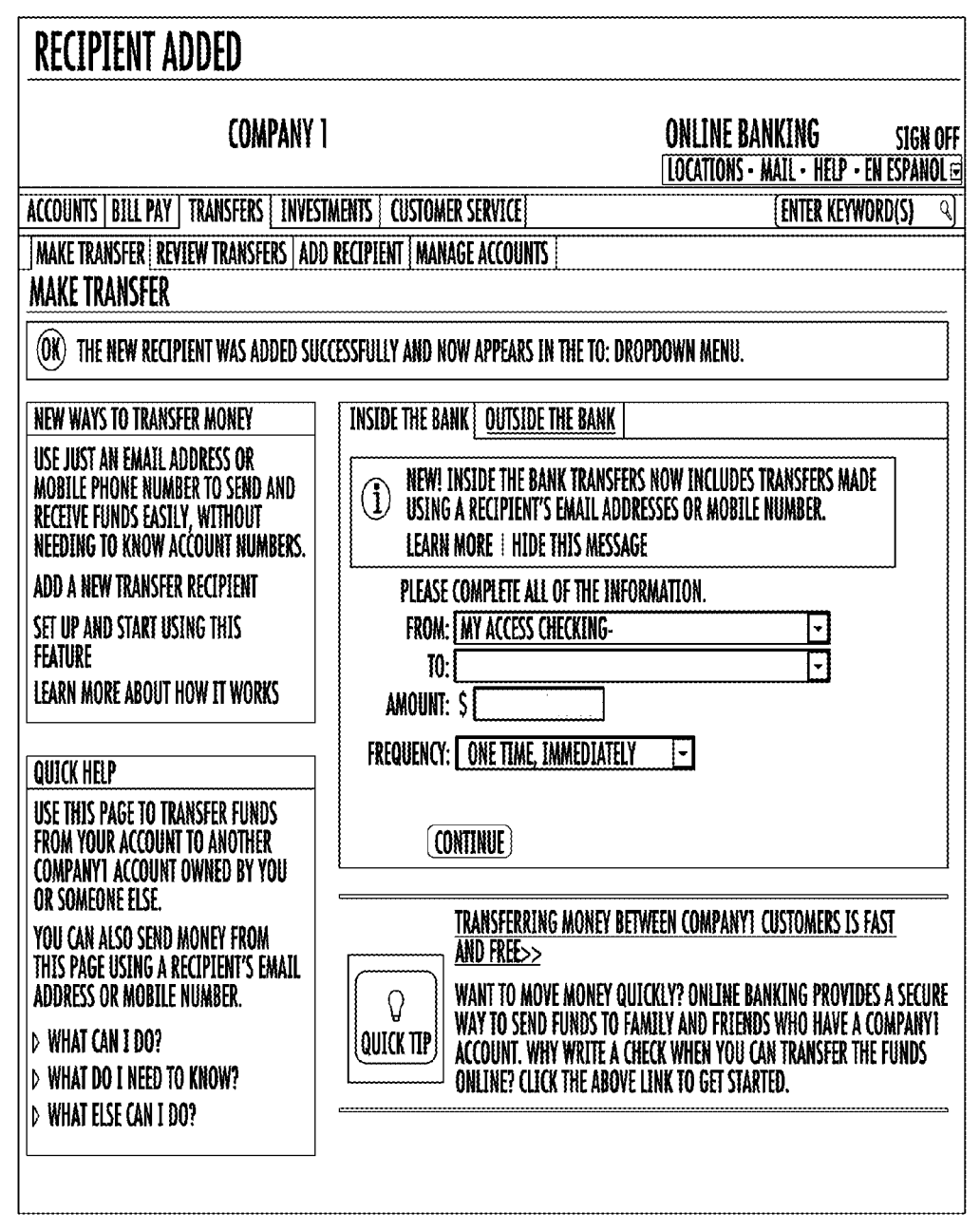

Turning the reader's attention to FIG. 8B, the process then moves to block 830 where the online banking system 600 presents a transfer GUI so that the first user can input all the information required to make the transfer. FIG. 9E shows that the online banking system 600 indicates to the first user that the new intended recipient has been successfully added based on the first user's previously entered information about the intended recipient. In addition, FIG. 9E shows the transfer GUI in which the online banking system 600 presents four sub-tabs under the "Transfers" tab described earlier. These four sub-tabs include a first sub-tab for a making a transfer, a second sub-tab for reviewing transfers, a third sub-tab for adding recipients, and a fourth sub-tab for managing accounts. FIG. 9E also show that under the first sub-tab for making transfers, the first user has the option of making an internal transfer (i.e., within the bank) by activating a corresponding tab and the first user also has the option of making an external transfer (i.e., outside the bank) by activating the corresponding tab. Under the sub-tab for making internal transfers, the online banking system 600 presents a drop-down list that lists all the accounts from which the first user can transfer money. The online banking system 600 also presents a drop-down list that lists all the recipients (full name or nickname and either a corresponding alias type or financial institution account type) to whom the first user can transfer money. In one embodiment, only the nickname of the recipient and the associated alias type or financial institution account type are listed in the drop-down list. The online banking system 600 also presents a text box where the first user can input the amount of money that the first user intends to transfer to the intended recipient. In one embodiment, the online banking system 600 presents a drop-down list which lists several frequency options if the first user wants to periodically make the same transfer. In addition, the frequency drop-down list is configured to allow the first user to select a one-time transfer option with the transfer occurring immediately or at a preconfigured time in the future. The online banking system 600 also presents the payment that the first user will incur if the first user proceeds with the P2P transfer. As previously discussed, in specific embodiments, user payment may be associated with alias type transfers, (i.e., transfers to an email address, mobile telephone number, etc.) while no payment may be associated with a financial institution account transfer. The online banking system 600 also presents to the user activatable help text near the transfer payment if the user wants to understand how the transfer payment was computed. The online banking system 600 also presents a button to indicate to the online banking system 600 that the first user has entered all the required information and intends to continue with the P2P transfer.

Returning the reader to FIG. 8B, the process then moves to block 832, at which a transfer account is selected from the drop-down list of user bank accounts. As indicated in FIG. 9E, under the sub-tab for making internal transfers within the bank, the first user selects the appropriate account from drop-down list that lists all the accounts from which the first user can transfer money.

The process then moves to block 834 of FIG. 8B, at which a transfer recipient (i.e., second user) is selected from the drop-down list of recipient nicknames. As indicated in FIG. 9E, the first user also selects the appropriate recipient from a drop-down list that lists all the recipients to whom can transfer money. In one embodiment, the person selected by the first user is the newly added recipient whose information was added by the first user on FIG. 9D.

The process then moves to block 836 of FIG. 8B, at which the transfer amount is entered. As indicated in FIG. 9E, the first user inputs into the amount textbox the amount of money that the first user intends to transfer to the intended recipient. In one embodiment, the first user selects an appropriate frequency option from a drop-down list which lists several frequency options, such as, a one-time, immediate transfer, a one-time future transfer, a periodic transfer over a preconfigured cycle or the like.

The process then moves to block 838 of FIG. 8B. Here, the online banking system 600 determines whether the recipient selected by the first user in block 834 is associated with an alias or a financial institution account number. If the selected recipient is associated with an alias, then the process moves to block 840 where the online banking system 600 displays a pre-confirmation page where the transfer payment is added to the amount entered in block 836. This pre-confirmation page is displayed in FIG. 9F and is described in greater detail below. If the selected recipient is associated with a financial institution account and, thus, no fee payment is required or once the payment has been added to the alias-type transfer, the process moves to block 842.

In block 842, the online banking system 600 determines whether the total transfer amount exceeds the maximum permitted in the transaction. In one embodiment, the maximum amount that can be transferred using the P2P service is dependent on several factors including, but not limited to, the first user's identity, the recipient's identity, the length and nature of the first user's relationship with the financial institution, the length and nature of the recipient's relationship with the financial institution, the amount of funds that the first user has deposited at the financial institution, the first user's financial institution status, etc. In one embodiment, the maximum amount that can be transferred using the P2P transfer method is dynamically determined at the time the transfer is set-up by a supporting application that works in conjunction with or is embedded within the online banking system 600.

If the transfer amount is above the maximum permitted in this particular transaction, the process moves to block 844 of FIG. 8B and the online banking system 600 displays an error message to the first user.

Figure 9F:

If the transfer amount is below or equal to the maximum permitted in this particular transaction, the process moves to block 846 of FIG. 8B where the online banking system 600 requests the first user's confirmation of the transfer and notice of recipient consent as indicated on the screenshot provided in FIG. 9F. As shown in FIG. 9F, the online banking system 600 displays a text message asking whether the first user wants to make the transfer. As shown in FIG. 9F, the online banking system 600 also displays the account from which funds will be transferred if the first user chooses to proceed with the transfer, the recipient's nickname of the recipient and alias type or financial institution account type, the amount of money that will be transferred if the first user chooses to proceed with the transfer, the transfer payment that will be incurred by the first user if the first user chooses to proceed with the transfer, the total amount of the transaction if the first user chooses to proceed with the transfer, the account from which the first user executes the transfer if the first user chooses to proceed with the transfer, etc. In another embodiment of the invention, an entity or person other than the first user will incur the transfer payment. In one embodiment, only a few characters of the identifying information for the sending account are displayed. As shown in FIG. 9F, the online banking system 600 informs the first user that the selected recipient's email or mobile device must be set up to receive transfers via the P2P service described herein. As shown in FIG. 9F, the online banking system 600 also informs the first user that the online banking system 600 will notify the selected recipient using the email address or mobile number provided by the first user. As shown in FIG. 9F, the online banking system 600 also informs the first user that the transfer will be canceled if the selected recipient does not set up a P2P alias transfer account within a preconfigured number of days, for example fourteen days or the like. As shown in FIG. 9F, the online banking system 600 presents two decision buttons to the first user. The first decision button is activatable to confirm the first user's intention to make a transfer, and the second button is activatable to decline the transfer. As shown in FIG. 9F, the online banking system 600 also presents a checkbox to the first user where the first user, by checking or otherwise activating the box, confirms that the first user has obtained the consent of the selected recipient to receive text messages or other forms of communication associated with the transfer of funds from the first user to the selected recipient. Once the first user checks or otherwise activates this checkbox, the first button associated with confirming the first user's intention to make a transfer moves from a dormant state to an activatable state.

Figure 9G:
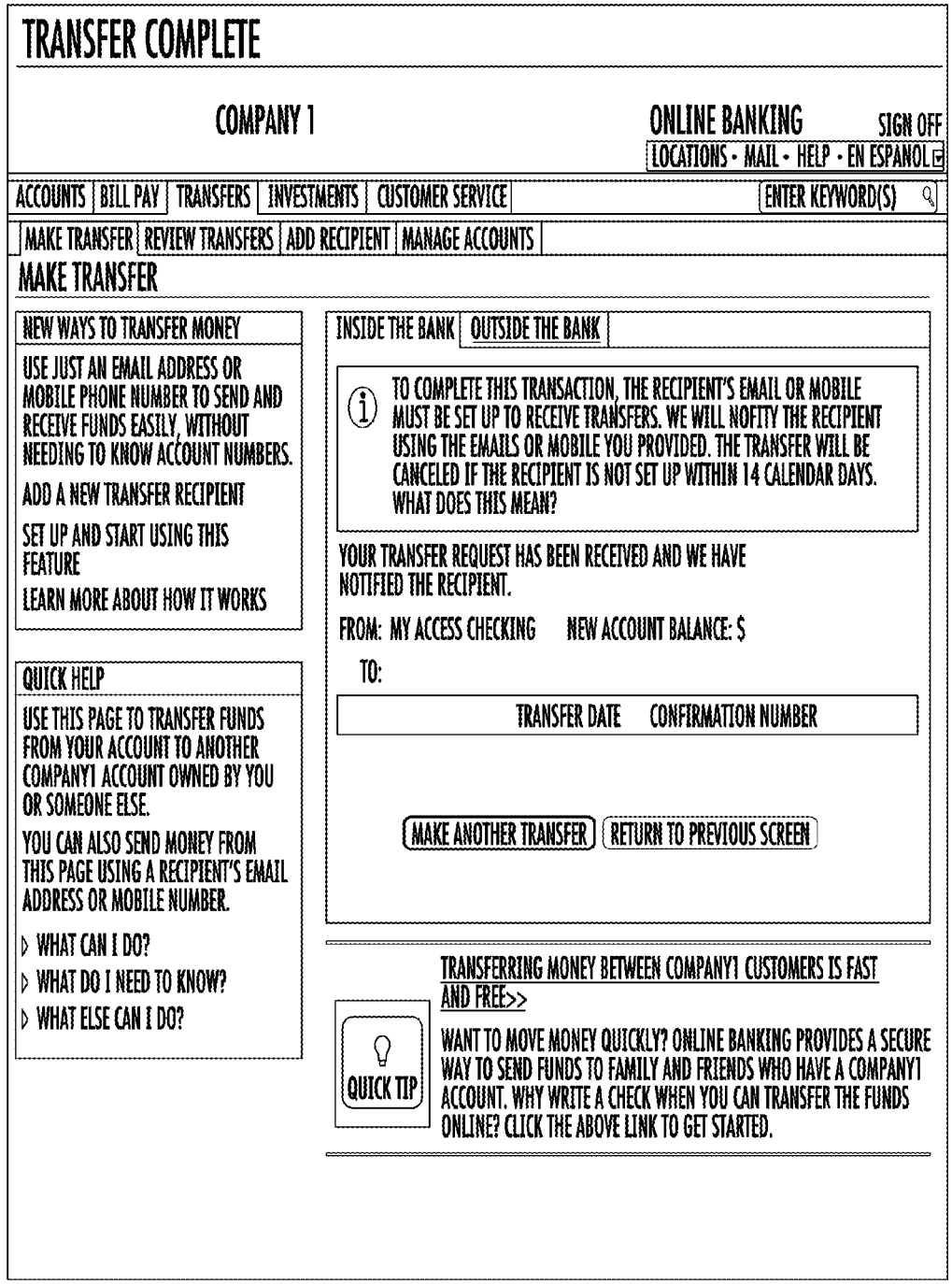

Returning to FIG. 8B, the process then moves to block 848 where the first user can activate the first button associated with confirming the first user's intention to make a transfer. Alternatively, the first user can activate the second button associated with canceling the transaction. Once the user activates the button confirming the transfer, as shown in FIG. 9G, the online banking system 600 displays a message to the first user that the transfer request has been received by the online banking system 600 and that the recipient has been notified. As shown in FIG. 9G, the confirmation page displays an identifier from the account from which money will be transferred along with the new account balance after the deducting the total amount for the transfer. As shown in FIG. 9G, the confirmation page also displays the nickname of the recipient to whom the money will be transferred and the associated alias type. The confirmation page also displays the amount transferred, the payment associated with the transaction, the transfer date, and a unique confirmation number. The online banking system 600 also provides a button on the page so that the first user can choose to make another transfer. The online banking system 600 also provides activatable text for the first user to return to the previous screen of the P2P transfer process. As shown in FIG. 9G, the online banking system 600 informs the first user that the selected recipient's email or mobile device must be set up to receive transfers via the P2P service. As shown in FIG. 9G, the online banking system 600 also informs the first user that the online banking system 600 will notify the selected recipient using the email address or mobile number provided by the first user. As shown in FIG. 9G, the online banking system 600 also informs the first user that the transfer will be canceled if the selected recipient does not set up a P2P transfer account within a pre-determined number of days.

Referring to FIG. 8C, the process then moves to block 850 where the online banking system 600 determines if the recipient is associated with an alias or a financial institution account number. If the recipient is associated with a financial institution account number, the process moves to block 852 where the online banking system 600 uses the financial institution account number to initiate an Automated Clearing House (ACH) transfer or other type of transfer. If the recipient is associated with an alias, then, the process moves to block 854 where the online banking system 600 sends the alias and the recipient's name to an alias data repository 700.

The process then moves to block 856 where the alias data repository 700 looks up the alias in an alias datastore. Then the process moves to block 858, where the alias data repository 700 determines whether the alias is associated with a financial institution account. If the alias is associated with a financial institution account, then the process moves to block 860 where, if the alias data repository 700 determines that the provided name matches the name in the datastore, then the process moves to block 852 of FIG. 8C where the online banking system 600 uses the financial institution account number to initiate an ACH transfer or other type of transfer. If in block 860 of FIG. 8C, the provided name does not match a name in datastore, then the online banking system 600 displays an error message to the first user that the transfer cannot be completed.

If in block 858 of FIG. 8C, the alias data repository 700 determines that the alias is not associated with a financial institution account, then the process moves to block 870 of FIG. 8D where the online banking system 600 determines if the recipient (second user) has an eligible financial institution account. If the recipient (second user) does not have an eligible financial institution account, then at block 845, the online banking system 600 uses an alias to send the recipient notification of requested transfer from the first user and an offer to open a financial institution account with the financial institution that manages the online banking system 600. In one embodiment, the alias is a phone number or an email address. Then the process moves to block 847 where the online banking system 600 provides notification to the first user that transfer or notice of transfer request to the second user has been initiated.

The process then moves on from block 845 to block 874 of FIG. 8D, where the second user decides if they desire to open a financial institution account at the financial institution associated with the online banking system 600. If the recipient does not desire to open an account, then at block 862, the online banking system 600 cancels the transfer and notifies the first user.

If in block 874 of FIG. 8D, the second user (recipient) decides to open a new financial institution account, the online banking system 600, in block 840, opens a new account for the second user. Subsequently, the second user (recipient) must determine in block 877 whether the second user registers the new financial institution account for the P2P service via alias.

As shown in FIG. 8D, if the second user in block 877 does not register the new financial institution account opened in block 874, then, at block 862, the online banking system 600 cancels the transfer and notifies the first user.

As shown in FIG. 8D, if the second user registers the new financial institution account in block 877 for P2P transfers via alias, then the online banking system 600, in block 840, uses the new registered financial institution account to initiate an ACH transfer or other type of transfer. The process then proceeds to block 841 where the online banking system 600 sends the alias and the new registered account information to the alias data repository 700. The process then proceeds to block 862 of FIG. 8D where the alias data repository stores recipient's alias in alias datastore along with recipient's new registered financial institution account.

If the recipient (second user) has an eligible financial institution account as determined by the online banking system 600 in block 870, then the process moves to block 872 in FIG. 8D where the online banking system 600 uses an alias (e.g., phone number or email address) to send recipient notification of requested transfer, and offers to register the recipient's financial institution account and alias. As shown in FIG. 8D, then the process moves to block 847 where the online banking system 600 provides notification to the first user that transfer or notice of transfer request to the second user has been initiated. As shown in FIG. 8D, the process then moves on to block 874 of FIG. 8D, where if the second user (recipient) decides not to register the second user's financial institution account for P2P transfers via alias, then the online banking system 600 cancels the transfer and notifies the first user.

As shown in FIG. 8D, if the second user registers the eligible financial institution account in block 877, then, at block 840, the online banking system 600 uses the new registered financial institution account to initiate ACH or other type of transfer. The process then proceeds to block 841 where the online banking system 600 sends alias and the new registered account information to the alias data repository. The process then proceeds to block 862 of FIG. 8D where the alias data repository stores recipient's alias in alias datastore along with recipient's new registered financial institution account.

FIGS. 10A-10C provide flow charts illustrating a process 1000 for receiving P2P payments, in accordance with an embodiment of the invention. FIGS. 10A-10C illustrate the flow chart in terms of "swim lanes" associated with entities which may perform the operations in each respective swim lane. The entities illustrated in the exemplary Figures are a financial institution's online banking system and a first user (recipient) using a first personal computing device. However, it should be noted that other entities could also be involved and some embodiments of the invention may not be limited to the two entities illustrated in FIGS. 10A-10C. Additionally, it should be understood that, in other embodiments of the invention, the entities need not be required to perform the actions illustrated in each respective swim lane. For example, some of the process steps described herein may be performed by the first entity (or other entities) even though the element may be illustrated as in the swim lane of the second entity. Similarly, in some embodiments, some of the process steps may be performed by the second entity (or other entities) even though the element may be illustrated as in the swim lane of the first entity (or even in the customer swim lane).

The process 1000 in FIG. 10A starts with block 1005 where an online banking system 600 using the alias, such as an email address or mobile telephone number, sends a first user (recipient) notice of a requested transfer from a second user, the notice including a link to the online banking system 600 and a confirmation number.

The process then proceeds to block 1010 where a first user (recipient) activates the link provided with the notice.

The process then proceeds to the screenshot of a page as shown in FIG. 11A where the online banking system 600 presents a sign-in page. The online banking system 600 alerts the first user (recipient) that to accept the transfer, the first user will need an eligible checking or saving account at a participating bank. For customers who hold accounts at the financial institution that manages the online banking system 600, the online banking system 600 presents a widget with a textbox that allows the first user to enter login or other authenticating information. The online banking system 600 also provides a link for the first user to enroll with the financial institution's online banking system. For customers of other participating financial institutions, the online banking system 600 provides a sign-in button, which may be configured to either display a sign-in widget on the instant page or provide a link to another page where the first user can enter login information for the participating financial institution. The online banking system 600 also notifies the first user that if the first user does not have an account with one of the participating banks, that first user can open an account at the financial institution that maintains the online banking system 600. The online banking system 600 notifies the first user that he or she may review the terms of opening a new account at this financial institution, including any payment that may be incurred by the first user in opening this new account. The online banking system 600 also notifies the first user that if the first user does not want to open a new financial institution account, the first user may notify the sender to arrange an alternate transfer method. The online banking system 600 also notifies the first user that the transaction will be canceled if it is not accepted within a pre-determined period of time.

The process then proceeds to block 1020 of FIG. 10A where the first user (recipient) determines whether the first user has an account with the financial institution that manages the online banking system 600. If the first user has a financial institution account with the financial institution that manages the online banking system 600, then the process proceeds to block 1050 where the first user enters authentication information into the textbox shown in FIG. 11A.

As shown in FIG. 10A, if the first user does not have a financial institution account with the financial institution that manages the online banking system 600 then the process proceeds to block 1022 where the first user determines whether the first user has an account with participating financial banks or financial institutions. If the first user has a financial institution account with a participating financial institution, the process proceeds to block 1040 where the first user can select the participating financial institution sign-in link as described previously and illustrated on FIG. 11A. The process then proceeds to block 1045 where the online banking system 600 forwards the first user to a participating financial institution's website or alternatively, the online banking system 600 opens a widget or an applet on the same window as that shown in FIG. 11A or a new pop-up window.

As shown in FIG. 10A, if, in block 1020, the first user does not have an account with the financial institution that manages the online banking system 600 and if, in block 1024, the first user (recipient) does not open a new account with the bank that manages the online banking system 600, then after a defined period of time without recipient (first user) acceptance, the online banking system 600 cancels the transfer and notifies the second user (sender).

As shown in FIG. 10A, in block 1024, if the first user opens a new account with the bank that manages the online banking system 600, then the first user, in block 1025, selects the link directing the first user to open a new account with the bank that manages the online banking system 600. This link described is shown in FIG. 11A and described previously.

As shown in FIG. 10A, the link in block 1025 directs the online banking system 600 to display a new account application GUI to the first user, which is readily approved and opened for the first user after receiving any pertinent information that may be required to open and approve a new account at the financial institution that manages the online banking system 600. The process then proceeds to block 1050 in FIG. 10A where the first user enters authentication information into the textbox shown in FIG. 11A.

The process then moves to block 1060 on FIG. 10B where the online banking system 600 prompts the first user to enter a confirmation number received with the transfer notice and agree to the terms governing the transfer. A screenshot for the GUI that handles this process is shown in FIG. 11B. As shown in FIG. 11B, the online banking system 600 indicates to the first user that this is the start of the procedure to accept a transfer to money to the first user's email address or mobile number. As shown in FIG. 11B, the online banking system 600 prompts the first user to enter the received confirmation number in a checkbox. As shown in FIG. 11B, the page also has two buttons—a first button configured for the first user to indicate the desire to proceed with accepting the transfer and a second button configured for the first user to indicate the desire to not proceed with the transfer. As shown in FIG. 11B, the first button can change from a dormant state to an activatable state by checking the check-box to confirm that the first user has a) has read and agrees to the terms of the service agreement, including the terms of the Email/Mobile Network Transfer section; b) consents to receive email and automated text messages about Email/Mobile Transfers; c) will only register mobile numbers where the first user is the account holder; or if the first user is not the account holder, he or she has the account holder's permission to register that mobile number; and d) will obtain the consent of the person to whom he or she wants to send a Mobile Transfer text message to receive the automated text message. In one embodiment, the first user has to always go through the procedure of accepting the transfer. In other embodiments, the first user does not have to go through the procedure accepting the transfer for any transfer after the first transfer.

Subsequently, in block 1065 of FIG. 10B, the first user enters a confirmation number in the appropriate textbox as shown in FIG. 11B and agrees to the terms that govern the transaction by activating the appropriate checkbox. The first user then activates the first button to continue the process of accepting the transfer.

The process then proceeds to block 1068 of FIG. 10B where the online banking system 600 uses the confirmation number entered in block 1065 to identify or confirm the transfer request.

Then the process proceeds to block 1070 of FIG. 10B where the online banking system 600 prompts the first user to register the alias to which transfer notice was sent. A screenshot of this registration page is shown in FIG. 11C. As shown in FIG. 11C, the online banking system 600 indicates to the first user that if the first user has received a notice that funds were sent to the first user, then the first user will need to set up to accept transfers to the same email address or mobile number that received the transfer notice. The page shows a first textbox where the user can enter the alias that received the transfer notice, and a second textbox where the user can confirm the alias entered in the first textbox by re-entering the alias in the second textbox. The online banking system 600 also prompts the user to select the appropriate account to link to the alias that will receive the funds by selecting the appropriate account from a drop down list. The online banking system 600 also prompts the user to check a checkbox, whereby the first user by checking the checkbox agrees that by registering the alias, he or she is the alias account holder, or has the alias account holder's permission to register it, and consents to receive email and text messages about alias transfers at this email address or phone number. In some embodiments, the online banking system 600 presents an authentication widget as shown in FIG. 11C and described in further detail below. The page also has two buttons—a first button configured to allow the first user to indicate a desire to proceed with receiving the transfer and a second button configured to allow the first user to indicate a desire not to proceed with receiving the transfer. This first button only becomes activatable after the first user enters all the required information on the page and has been further authenticated, as in some embodiments. In one embodiment, the online banking system 600 also saves the information entered on this page, so that the first user does not have to re-register an alias every time the first user receives a P2P transfer.

The process then proceeds to block 1075 where the first user enters the alias in the appropriate textbox, confirms the alias in the appropriate textbox, selects the account to receive the funds from the drop-down list shown in FIG. 11C, and checks the checkbox that indicates that the first user accepts the terms that govern the transfer. In some embodiments, the accounts listed in the drop-down list are identified by a few digits of the account number.

In some embodiments, the process then proceeds to block 1077 where the online banking system 600 requires additional authentication to register an alias. As illustrated on FIG. 11C, the online banking system 600 displays a widget which serves as an additional authenticating step before saving the information of the first user's associated alias. The online banking system 600 indicates to the first user that by activating the button in the widget for sending a code, the first user will receive a code on his or her mobile device. In another embodiment, the first user may receive a code through other means such as email, postal mail, and the like. In one embodiment, the widget is a first type of widget and the user can send a Safe Pass first type of code to the first user's mobile device.

The process then moves to block 1079 of FIG. 10B where the first user performs an additional authenticating step. As indicated on the screenshot shown in FIG. 11C, the first user activates the button within the widget for sending a code to the first user's mobile device. The first user than receives on his or her mobile device the code that he or she must input into the widget shown in FIG. 11C. Once the first user inputs the correct code into the widget and activates a button in the widget to confirm that the code is correct, the button that corresponds to adding a new recipient is activatable so that it can now be activated by the first user. The first user (recipient) activates this button so that the online banking system 600 can store the first user's alias. The first user can activate the first button on the page which indicates that the first user wishes to proceed with the transfer. The online banking system 600 indicates to the first user as shown in FIG. 11C that by activating the first button to continue with receiving the transfer, the first user will receive an enrollment code.

The process then moves to block 1080 of FIG. 10C where the online banking system 600 uses the registered alias to send an enrollment code to the device of the first user associated with the alias.

The process then moves to block 1082 of FIG. 10C where the online banking system 600 prompts the first user to enter the enrollment code that the first user received on the device associated with the alias. A page showing this block is captured on FIG. 11D. The online banking system 600 indicates to the first user that the first user must verify the alias (e.g., mobile number) to complete enrollment in the P2P transfer via system. In one embodiment, the page indicates to the first user that the first user should expect a text message from the bank that manages the online banking system 600. The page also has activatable text if the first user would like to know more about the use of enrollment codes. The page as shown in FIG. 11D indicates to the first user that the enrollment code must be entered into the appropriate textbook in order verify ownership of the mobile number or email address associated with the alias and complete enrollment with the P2P transfer service. As shown in FIG. 11D, the online banking system 600 also indicates to the first user that the enrollment number expires in a pre-determined number of minutes. After the enrollment number expires, the online banking system 600 will not be able use that enrollment code to verify ownership of the first user's mobile number associated with the transfer and will not be able to complete the enrollment of the first user (recipient). The page also has activatable text if the first user has not received an enrollment code or if the enrollment code has expired. The page indicates to the first user that messaging and data rates may apply for receiving the enrollment code. The page also has two buttons—a first button configured to allow the first user to indicate that the first user does not wish to proceed with the transaction and a second button configured to allow the first user to indicate that the first user desires to proceed with receiving the transfer. This second button only becomes activatable after the first user enters an enrollment code on the page. In some embodiments, this second button only becomes activatable after the first user enters a valid and unexpired enrollment code on the page.

The process then moves to block 1084 where the first user enters the enrollment code into the textbox that is shown in FIG. 11D.

The process then moves block 1086 where the online banking system 600 determines if the enrollment code entered by the first user matches the enrollment code sent by the online banking system 600 to the alias of the first user.

If the entered code in 1086 does not match the code sent to the alias, then, at block 1087, the online banking system 600 displays an error message to the first user that the transaction cannot proceed further. In one embodiment, the online banking system 600 allows the first user to correct any errors in the alias provided by the first user or in the code received by the first user. In one embodiment, the online banking system 600 only grants a pre-determined number of unsuccessful attempts to verify the code before rejecting the transfer.

If the entered code in 1086 matches the code sent to the alias, the process moves to block 1088 where the online banking system 600 processes any pending transfers involving the newly registered alias. As shown in FIG. 11E, the online banking system 600 indicates to the user that the verification of the alias has been completed. The online banking system 600 thanks the user for setting up an alias to accept transfers. The online banking system 600 indicates to the first user that people or entities can now send money to the first user using the first user's alias. The online banking system 600 indicates to the first user that any transfer to the first user's newly registered alias will be deposited to the account number shown on the page (see FIG. 11E). In one embodiment, the online banking system 600 only shows a pre-determined number of digits of the first user's financial institution account number. The page also indicates to the first user that the transfer request is now in process. As shown in FIG. 11E, the page shows details of the transfer, including, but not limited to the name of the sender, the amount, the date on which the sender sent the amount, the confirmation number, and the status of the transfer. The page also includes two buttons—the first button is configured to allow the first user to add another alias and the second button is configured to allow the first user to make a transfer using the newly registered alias.

The process then moves to block 1090 where the online banking system 600 sends the alias to the alias data repository 700 along with associated account information to be stored in the alias datastore.

FIG. 11F presents a GUI where the online banking system 600 presents four sub-tabs under the "Transfers" tab described earlier. These four sub-tabs are a first sub-tab for a making a transfer, a second sub-tab for reviewing transfers, a third sub-tab for adding recipients, and a fourth sub-tab for managing accounts. FIG. 11F also shows that under the first sub-tab for making transfers, the first user has the option of obtaining a set up to accept transfer by activating the associated link. The online banking system 600 indicates to the first user (recipient) that the first user may activate this link if the first user received a transfer notice, i.e., the first user received an email, text message, or other form of electronic communication that someone has sent funds to the first user. The online banking system 600 indicates to the first user that in order to complete the transfer and collect the funds, the first user must set up the first user's alias to accept transfers. The online banking system 600 also presents a activatable link configured to allow the first user to be directed to a page to learn more about this P2P transfer via alias method. The online banking system 600 also presents a help box where the first user can understand more about what the first user can do using the online banking system 600, what the first user needs to know, and what else the first user can do using the online banking system 600. The online banking system 600 also presents a message to the first user that transferring money within the bank is fast and free. The online banking system 600 also indicates to the customer that the feature of making a P2P transfer using a recipient's alias is a new feature, and that transfers within the bank now include transfers made using a recipient's alias. Alternatively, a user who intends to receive money using an alias can get set up by clicking on the activatable text associated with getting set up to accept transfers. This option is also illustrated by block 1095 of FIG. 10B where a user who accesses the online banking system 600 can register an alias by selecting an appropriate link. Therefore, in one embodiment, the user does not have to wait to receive a payment using the P2P transfer service before setting up an alias to receive transfers.

In one embodiment of the invention, both the sender and the recipient need to have financial institution accounts registered for P2P transfer via alias. In another embodiment of the invention, the sender needs to have a financial institution account registered for P2P transfer via alias, but the recipient does not need to have a financial institution account registered for P2P transfer via alias. In another embodiment of the invention, the recipient needs to have a financial institution account registered for P2P transfer via alias, but the sender does not need to have a financial institution account registered for P2P transfer via alias.

FIG. 12A presents a GUI where the online banking system 600 presents four sub-tabs under the "Transfers" tab described earlier. These four sub-tabs are a first sub-tab for a making a transfer, a second sub-tab for reviewing transfers, a third sub-tab for adding recipients, and a fourth sub-tab for managing accounts. FIG. 12A shows that under the first sub-tab for managing accounts, there are two lists. The first list is associated with outbound transfer recipients and indicates the status of transfers to recipients. The status page shows for each transfer the recipient's name, the recipient account's nickname, the status of the transfer, the date on which the transfer was made, and the amount of the transfer. The status page also provides activatable links for editing, deleting and adding selected information about outbound transfer recipients. The status page also provides an activable link for adding a recipient to the list of outbound transfer recipients. The second list under the first sub-tab for managing accounts is a list of inbound transfer options. The list contains information about the alias along with the account that the alias is linked to. As shown in FIG. 12A, there is an email alias listed that is associated with a particular account. The page also presents options (activable links) for a user to delete, add or edit information relating to inbound transfer options. As shown in FIG. 12A, the online banking system 600 describes the status of inbound transfer aliases. In one embodiment, if an alias has been inactive for a pre-determined number of days, the user may have to verify the alias by activating a verify button as shown in FIG. 12A. As shown in FIG. 12A, the online banking system 600 also displays a message to the user if the user has not associated an eligible account with an alias. In such a case, as shown in FIG. 12A, the page provides a button to select an eligible account to associate with an alias. In one embodiment of the invention, only a single alias can be linked to a financial institution account. In another embodiment of the invention, multiple aliases can be linked to a single financial institution account. In a further embodiment of the invention, a single alias can be linked to multiple financial institution accounts.

If, on FIG. 12A, a user activates the button for editing a recipient's information, the online banking system 600, in one embodiment, presents a pop-up window as shown in FIG. 12B where the user can change information regarding the recipient's first name, the recipient's last name, the nickname for the recipient as chosen by the user, and the recipient's alias. In one embodiment, the user has to re-enter the alias to confirm the alias. In one embodiment, the recipient's first name, the recipient's last name, the recipient's alias, and a confirmation of the recipient's alias must necessarily be entered, while the nickname is optional. In one embodiment, the pop-up window has two buttons: a first button to complete the process of editing the recipient's information and a second button to cancel the process of editing the recipient's information. In one embodiment, the editing button is not activatable until all the required information has been entered as shown in FIG. 12B and the information has been authenticated. In one embodiment, the user may not be able to edit the recipient's information until the user authenticates the information by activating a button in a widget to send a code to the user's mobile device, and subsequently enters that code into the textbox in the widget, as previously described. Once the user has been authenticated, the user can activate the appropriate button in the pop-up window shown in FIG. 12B to complete the process of editing the recipient's information.

If, in FIG. 12A, a user activates the button to delete a recipient, the online banking system 600, in one embodiment as shown in FIG. 12C, presents a pop-up window where the online banking system 600 asks the user whether the user is sure that he or she wants to delete the recipient from the list of outbound transfer recipients. The online banking system 600 notifies the user that once a recipient is deleted, the user will no longer be able to make transfers to that recipient. The pop-window of FIG. 12C also has two clickable buttons: a first button configured to confirm that the user wants to delete the recipient and a second button configured to retain the recipient on the list of outbound transfer recipients. Once the user activates on the button to delete a recipient, the recipient is removed from the list of outbound transfer recipients.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for online payment, the method comprising:

receiving, by a computer device processor, payment instructions for the online payment from a financial institution customer via an online financial institution application, wherein the payment instructions includes an alias inputted by the financial institution customer associated with a payment recipient for the online payment, a payment amount, and an account associated with the financial institution customer for the online payment, wherein the payment recipient is one or more individuals or entities the financial institution customer is providing online payment, wherein the alias comprises at least one of a mobile phone number, an email address, or social network identification information of the payment recipient;

determining, by the computing device processor, that the payment recipient is a registered payment recipient based at least in part on the alias associated with the payment recipient, wherein determining that the payment recipient is a registered payment recipient further comprises rejecting the online payment between the financial institution customer and the payment recipient if the payment recipient is not a registered payment recipient;

determining, by the computing device processor, an alias account associated with the alias and registered payment recipient, wherein the alias account is a financial account associated with the registered payment recipient and that is identified to accept payment from the financial institution customer for the online payment, wherein the alias account is determined by matching the alias and registered payment recipient to a payment account that has been identified as being associated with the alias and the registered payment recipient;

authorizing, by the computing device processor, a transfer for the online payment from the financial institution customer to the payment recipient based on the received payment instructions and that the payment recipient is a registered payment recipient based on the alias, wherein the transfer of the online payment from the financial institution customer to the payment recipient is authorized only if it is under a maximum amount pre-determined by the financial institution customer;

communicating, by the computing device processor, a payment notification of the online payment to the payment recipient based on contact information associated with the payment recipient alias; and transferring, by the computer device processor, a payment amount from an account associated with the financial institution customer to the alias account associated with the alias of the payment recipient.

2. The method of claim 1, further comprising transmitting an invitation to the customer, the invitation inviting the customer to participate in a payment transfer program.

3. The method of claim 1, further comprising initiating presentation of an option to add a new payment recipient.

4. The method of claim 3, further comprising prompting the customer to input an alias associated with the new payment recipient.

5. The method of claim 4, further comprising prompting the customer to input a name associated with the new payment recipient.

6. The method of claim 5, further comprising prompting the customer to execute an authentication step.

7. The method of claim 6, further comprising in response to determining the authentication step is successfully executed, storing the alias and the name associated with the new payment recipient in a list of payment recipients registered by the customer.

8. The method of claim 1, further comprising determining whether the payment amount is greater than a predetermined maximum amount.

9. The method of claim 8, further comprising in response to determining the amount is greater than the predetermined maximum amount, initiating presentation of an error message.

10. The method of claim 1, further comprising prompting the customer to confirm or cancel a payment transfer based on the payment instructions.

11. The method of claim 1, further comprising in response to determining the payment recipient is associated with a recipient account, using identification information associated with the recipient account to initiate a payment transfer based on the payment instructions.

12. The method of claim 1, further comprising determining whether the alias is associated with the alias account.

13. The method of claim 12, further comprising in response to determining the alias is associated with the alias account, determining whether the name of the payment recipient matches a name stored in the database.

14. The method of claim 13, further comprising in response to determining the name of the payment recipient does not match a name stored in the database, initiating presentation of an error message.

15. The method of claim 13, further comprising in response to determining the name of the payment recipient matches a name stored in the database, initiating a payment transfer based on the payment instructions to the alias account.

16. The method of claim 12, further comprising in response to determining the alias is not associated with an alias account, determining whether the payment recipient has an eligible account.

17. The method of claim 16, further comprising in response to determining the payment recipient has an eligible account, sending, using the alias, the payment notification and an offer to register the payment recipient's alias.

18. The method of claim 16, further comprising in response to determining the payment recipient does not have an eligible account, sending, using the alias, the payment notification and an offer to open a new account.

19. The method of claim 18, further comprising in response to determining the payment recipient does not want to open a new account, cancelling a payment transfer based on the payment instructions.

20. The method of claim 18, further comprising in response to determining the payment recipient opens a new account, initiating a payment transfer to the new account based on the payment instructions.

21. The method of claim 18, further comprising in response to determining the payment recipient opens the new account and registers the alias, sending the alias and information associated with the new account to a database, and storing the alias and the information associated with the new account in the database.

22. The method of claim 1, further comprising providing notification to the customer that a payment transfer based on the payment instructions is initiated.

23. The method of claim 1, wherein an account associated with the customer and the alias account are either managed by the same financial institution or managed by different financial institutions.

24. A computer program product for online payment, the computer program product comprising at least one non-transitory computer-readable medium having computer-executable instructions for a computer device processor to perform the following:

Receiving payment instructions for the online payment from a financial institution customer via an online financial institution application, wherein the payment instructions includes an alias inputted by the financial institution customer associated with a payment recipient for the online payment, a payment amount, and an account associated with the financial institution customer for the online payment, wherein the payment recipient is one or more individuals or entities the financial institution customer is providing online payment, wherein the alias comprises at least one of a mobile phone number, an email address, or social network identification information of the payment recipient;

determining—that the payment recipient is a registered payment recipient based at least in part on the alias associated with the payment recipient, wherein determining that the payment recipient is a registered payment recipient further comprises rejecting the online payment between the financial institution customer and the payment recipient if the payment recipient is not a registered payment recipient;

determining an alias account associated with the alias and registered payment recipient, wherein the alias account is a financial account associated with the registered payment recipient and that is identified to accept payment from the financial institution customer for the online payment, wherein the alias account is determined by matching the alias and registered payment recipient to a payment account that has been identified as being associated with the alias and the registered payment recipient;

authorizing a transfer for the online payment from the financial institution customer to the payment recipient based on the received payment instructions and that the payment recipient is a registered payment recipient based on the alias, wherein the transfer of the online payment from the financial institution customer to the payment recipient is authorized only if it is under a maximum amount pre-determined by the financial institution customer;

communicating a payment notification of the online payment to the payment recipient based on contact information associated with the payment recipient alias; and transferring a payment amount from an account associated with the financial institution customer to the alias account associated with the alias of the payment recipient.

25. A system for online payment, the system comprising:

a computer apparatus including a processor and a memory; and an online payment module stored in the memory, executable by the processor and configured to:

receive payment instructions for the online payment from a financial institution customer via an online financial institution application, wherein the payment instructions includes an alias inputted by the financial institution customer associated with a payment recipient for the online payment, a payment amount, and an account associated with the financial institution customer for the online payment, wherein the payment recipient is one or more individuals or entities the financial institution customer is providing online payment, wherein the alias comprises at least one of a mobile phone number, an email address, or social network identification information of the payment recipient;

determine via a computing device processor that the payment recipient is a registered payment recipient based at least in part on the alias associated with the payment recipient, wherein determining that the payment recipient is a registered payment recipient further comprises rejecting the online payment between the financial institution customer and the payment recipient if the payment recipient is not a registered payment recipient;

determine an alias account associated with the alias and registered payment recipient, wherein the alias account is a financial account associated with the registered payment recipient and that is identified to accept payment from the financial institution customer for the online payment, wherein the alias account is determined by matching the alias and registered payment recipient to a payment account that has been identified as being associated with the alias and the registered payment recipient;

authorize a transfer for the online payment from the financial institution customer to the payment recipient based on the received payment instructions and that the payment recipient is a registered payment recipient based on the alias, wherein the transfer of the online payment from the financial institution customer to the payment recipient is authorized only if it is under a maximum amount pre-determined by the financial institution customer;

communicate a payment notification of the online payment to the payment recipient based on contact information associated with the payment recipient alias; and transfer a payment amount from an account associated with the financial institution customer to the alias account associated with the alias of the payment recipient.

* * * * *